Sept. 8, 1931.    H. R. BRAND    1,822,433
BEVERAGE PREPARING AND DISPENSING MACHINE
Filed May 11, 1928    13 Sheets-Sheet 1

INVENTOR
H. R. Brand
BY
ATTORNEY

Sept. 8, 1931.  H. R. BRAND  1,822,433
BEVERAGE PREPARING AND DISPENSING MACHINE
Filed May 11, 1928   13 Sheets-Sheet 2

INVENTOR
H.R.Brand
BY
ATTORNEY

Sept. 8, 1931.  H. R. BRAND  1,822,433
BEVERAGE PREPARING AND DISPENSING MACHINE
Filed May 11, 1928   13 Sheets-Sheet 3
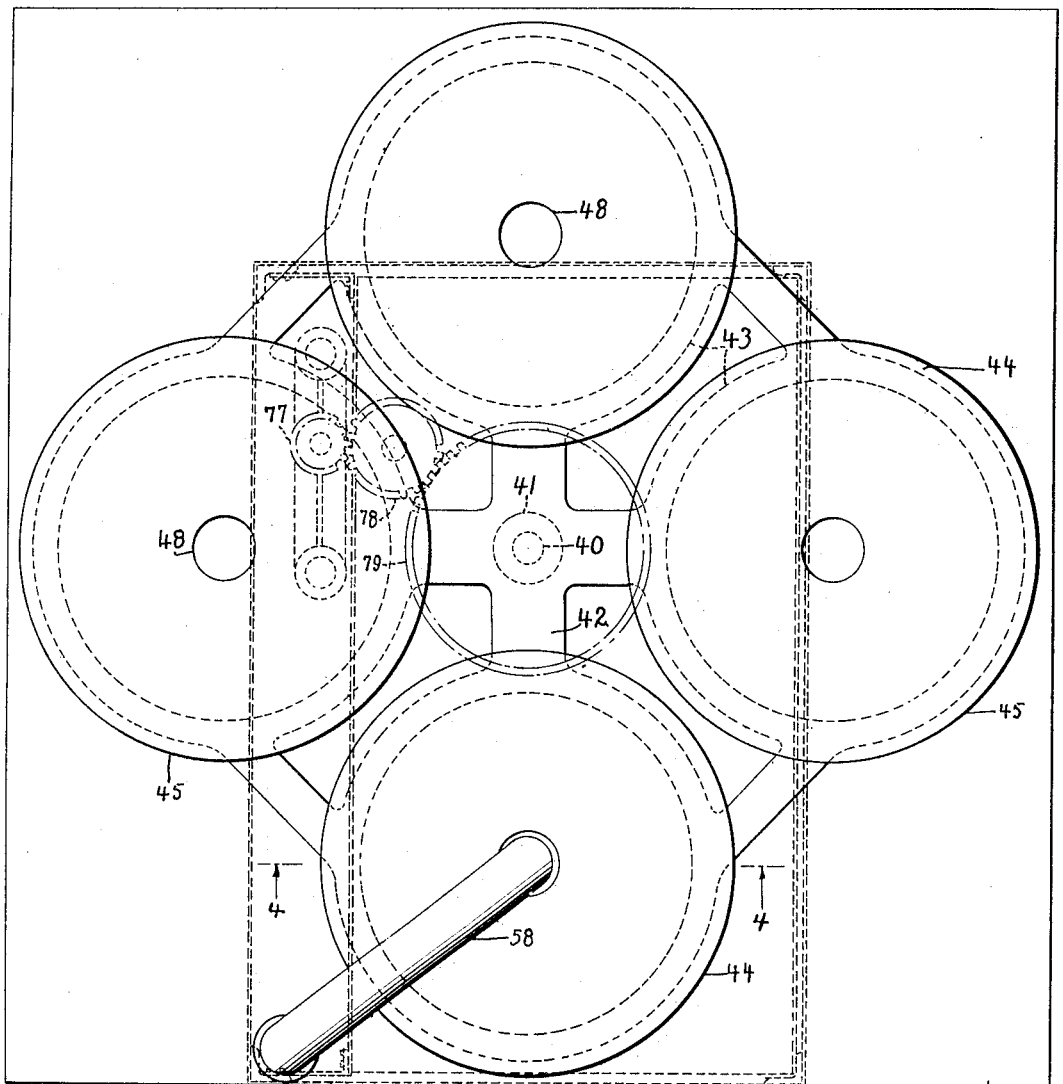
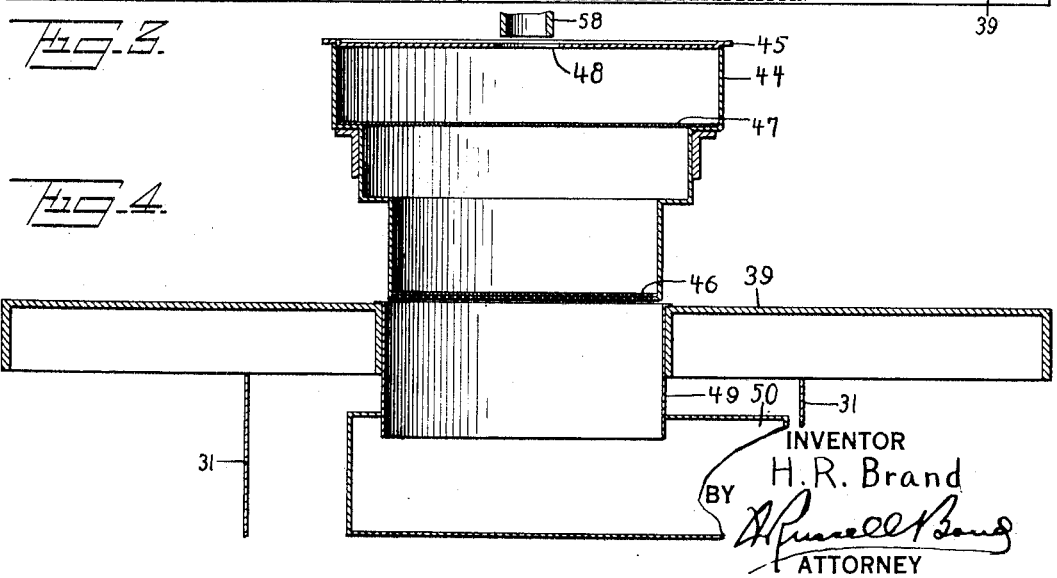

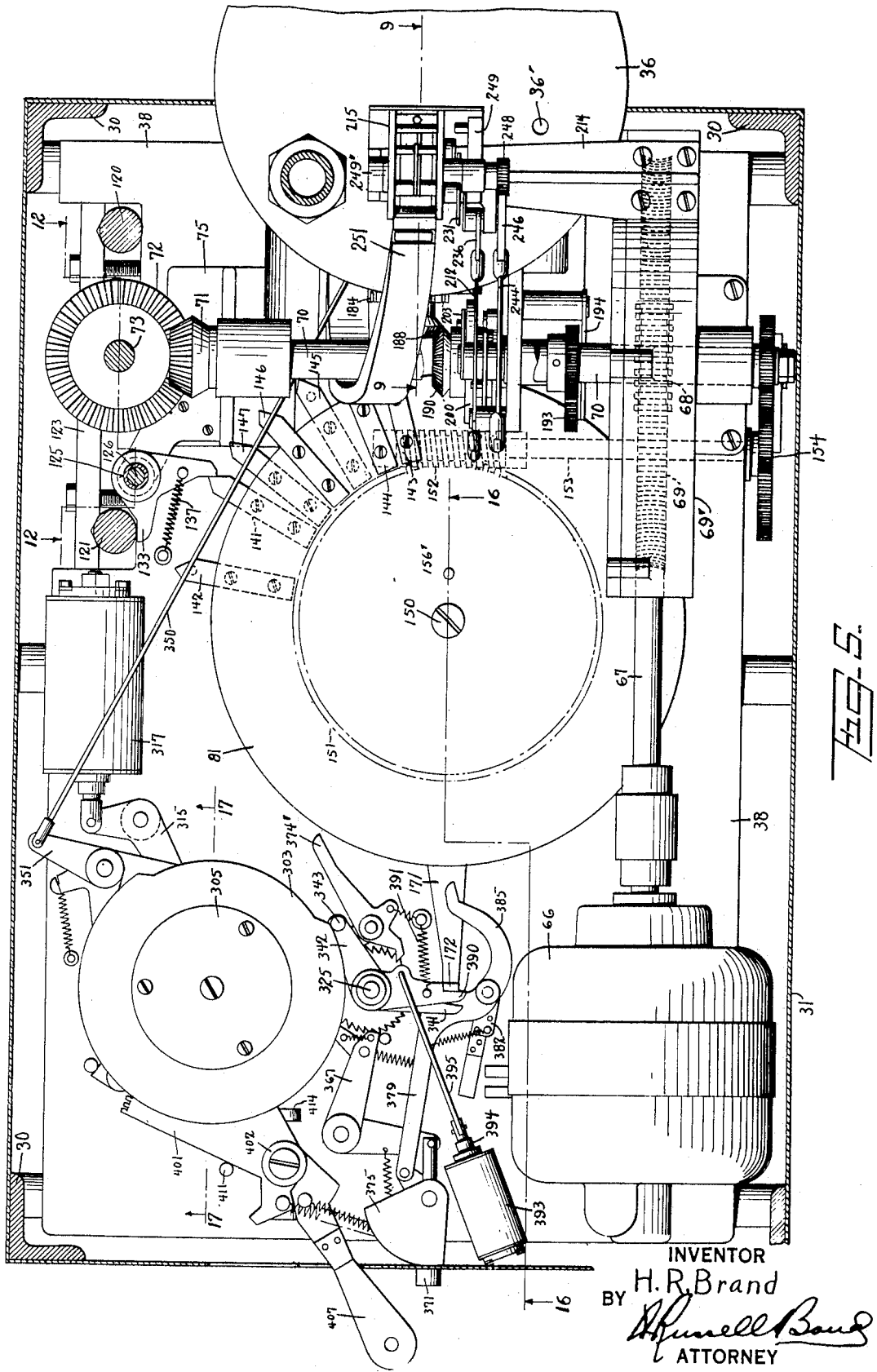

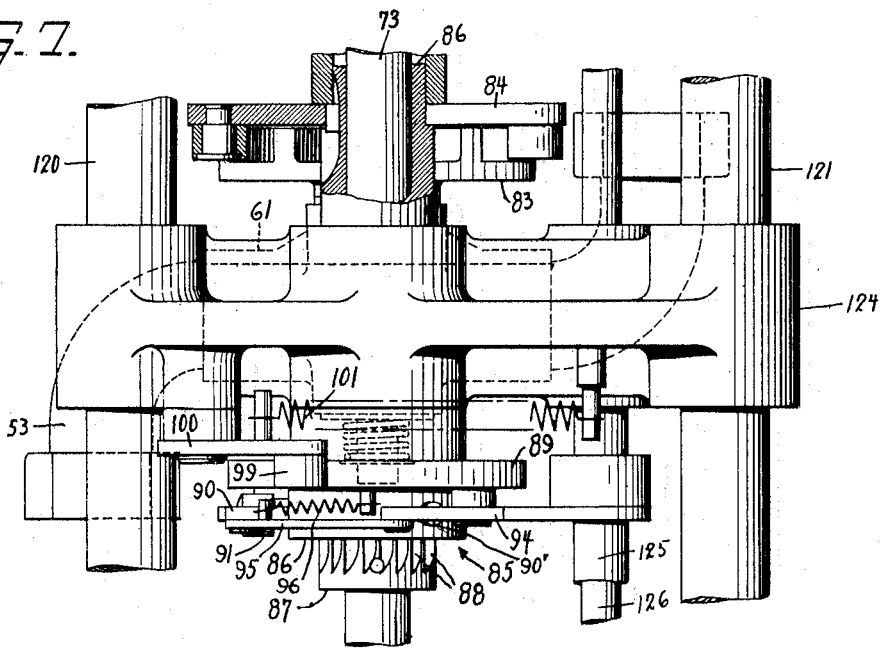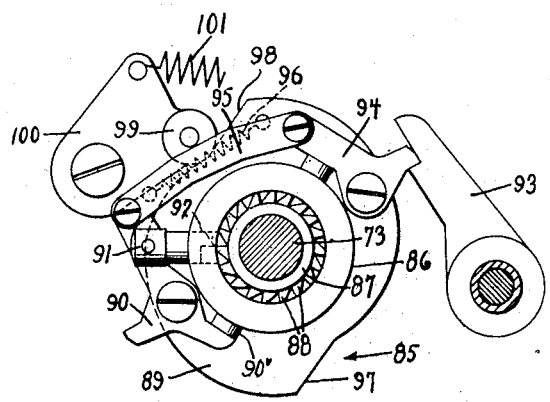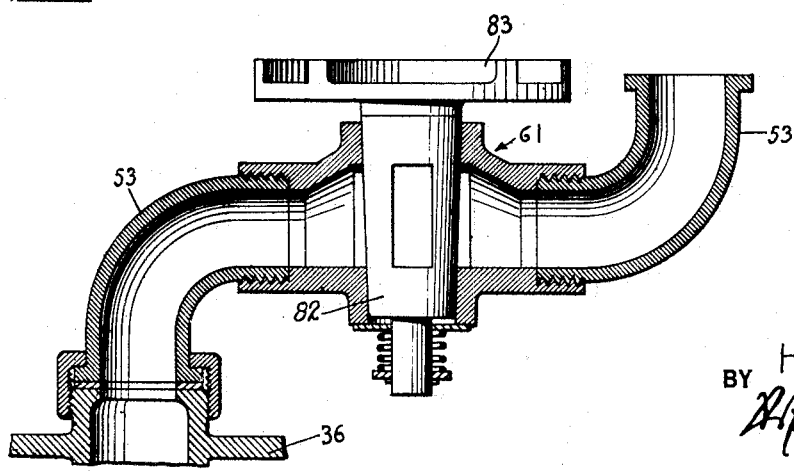

Sept. 8, 1931.  H. R. BRAND  1,822,433
BEVERAGE PREPARING AND DISPENSING MACHINE
Filed May 11, 1928   13 Sheets-Sheet 6
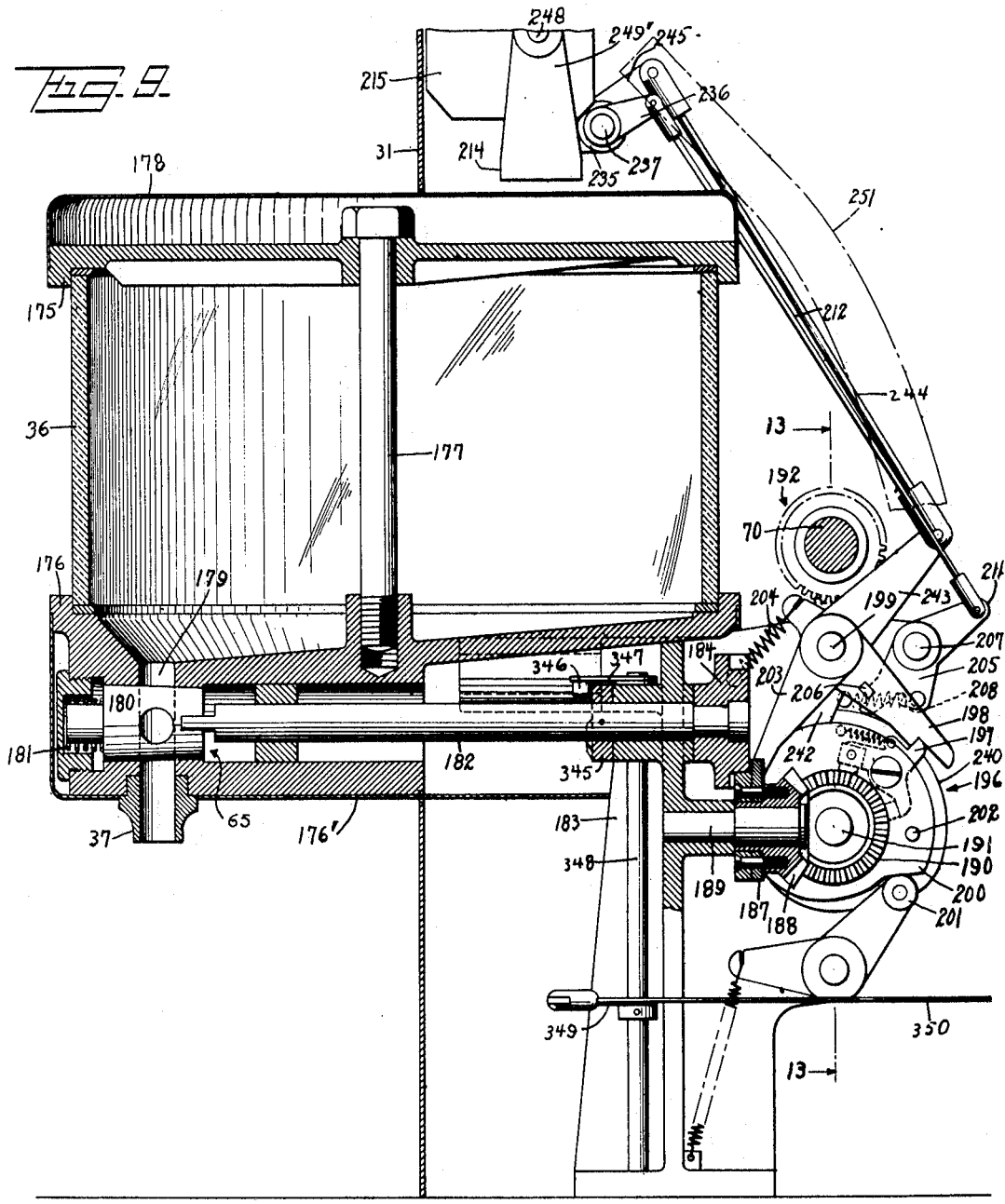
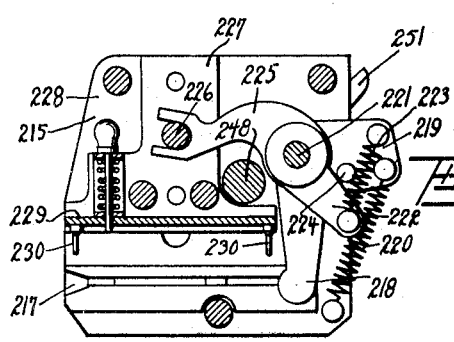
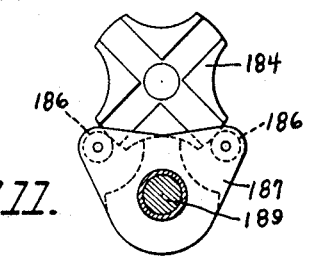
INVENTOR
H. R. Brand
BY
ATTORNEY

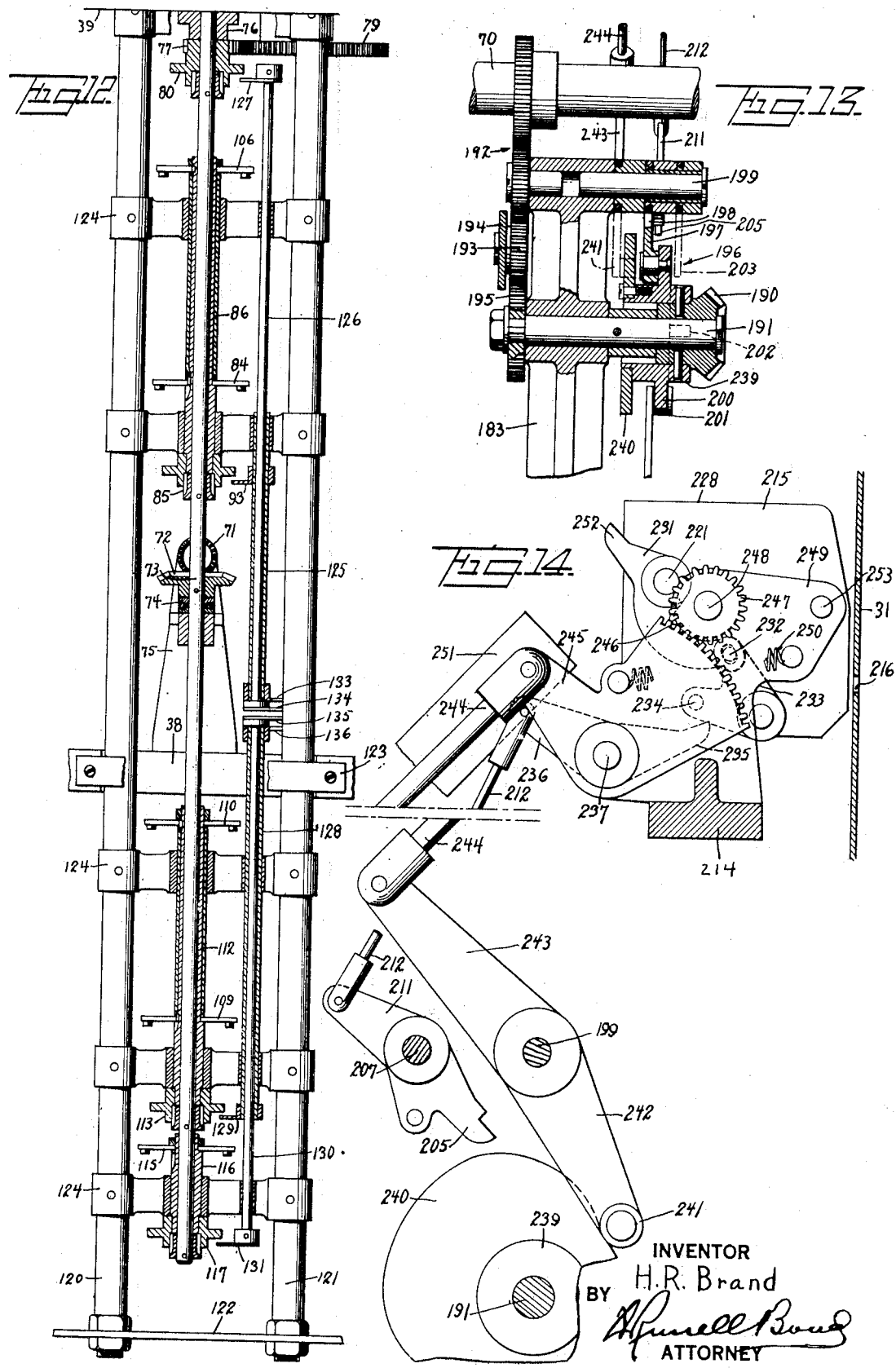

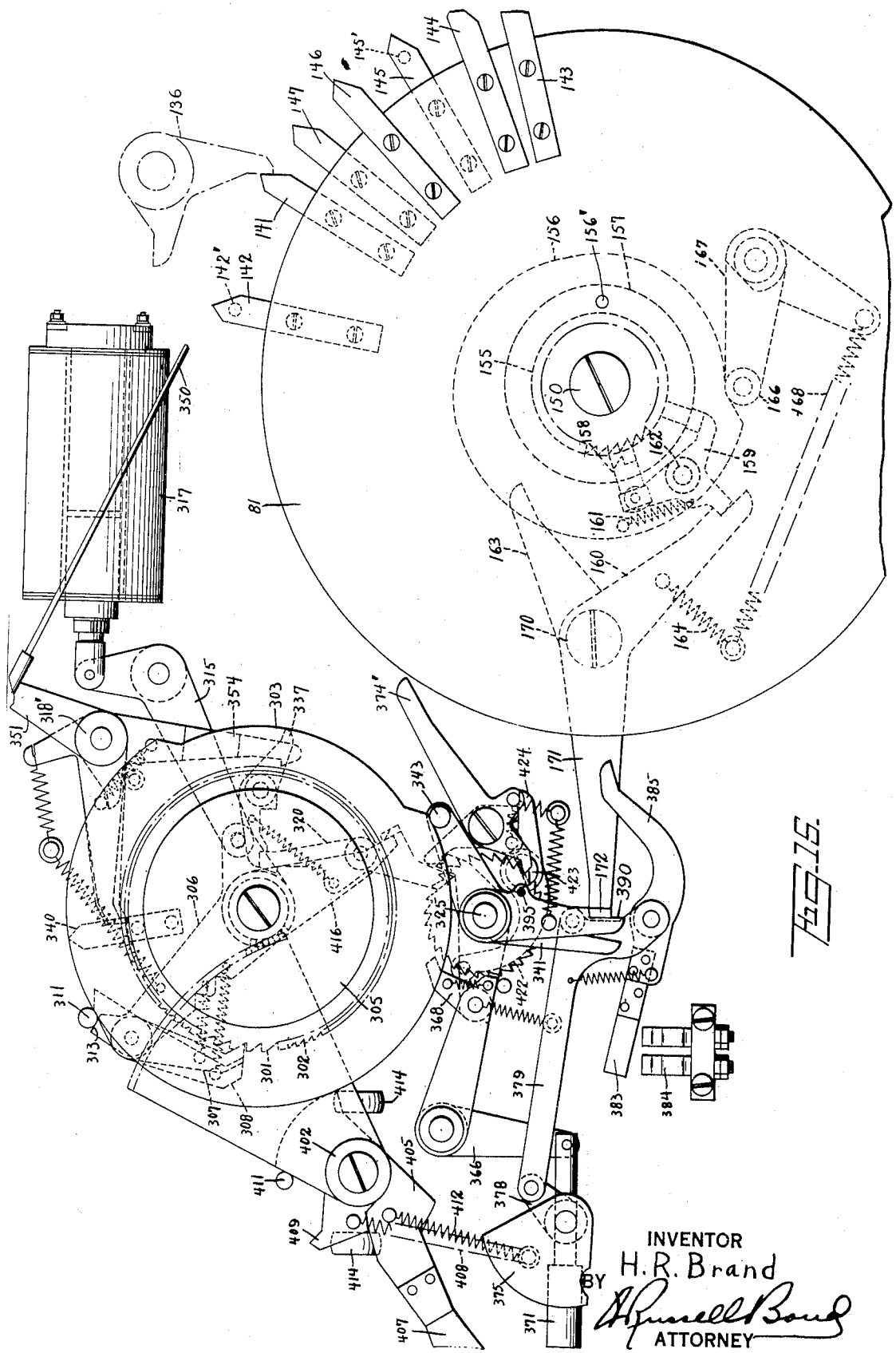

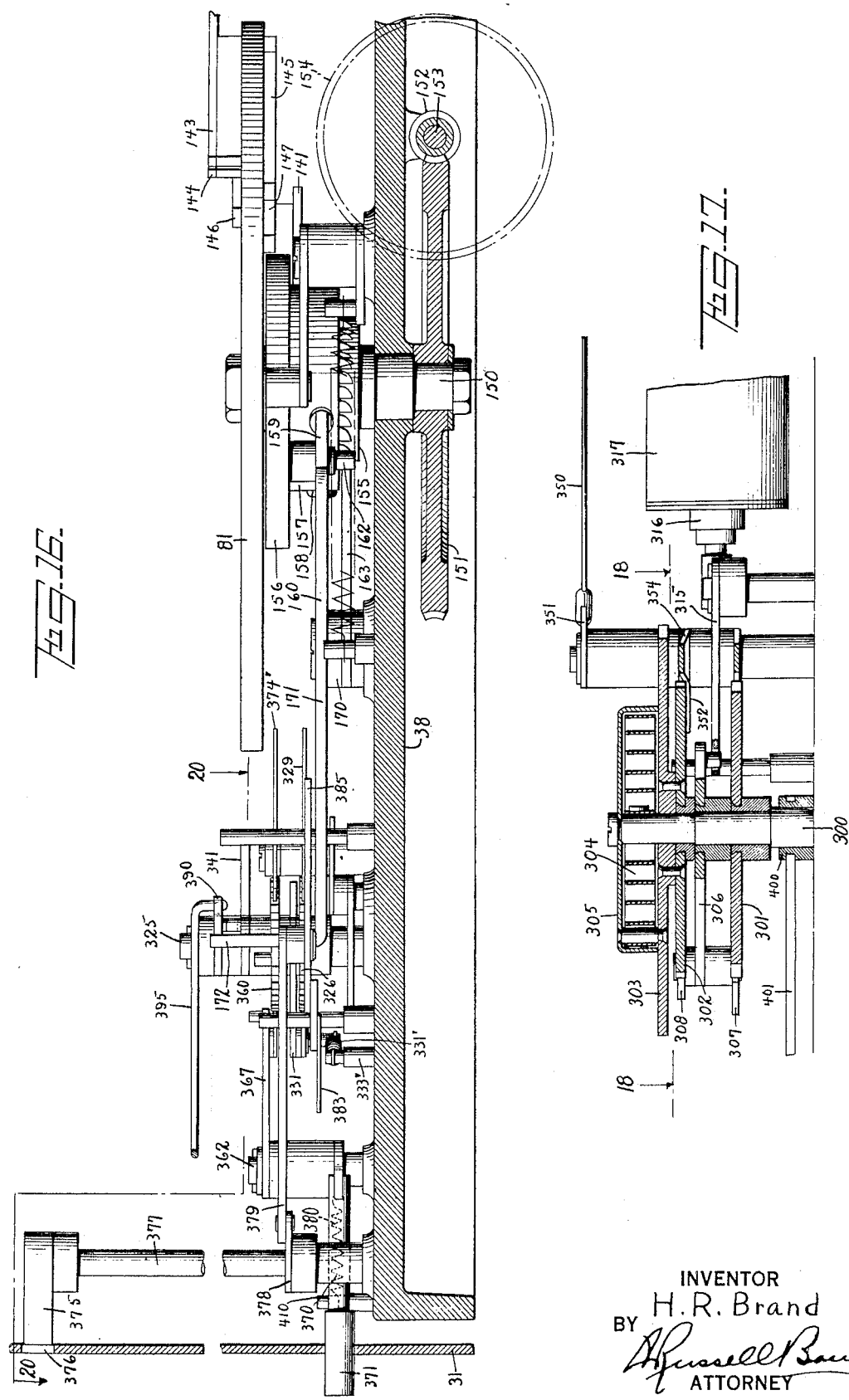

Sept. 8, 1931.  H. R. BRAND  1,822,433
BEVERAGE PREPARING AND DISPENSING MACHINE
Filed May 11, 1929    13 Sheets-Sheet 10
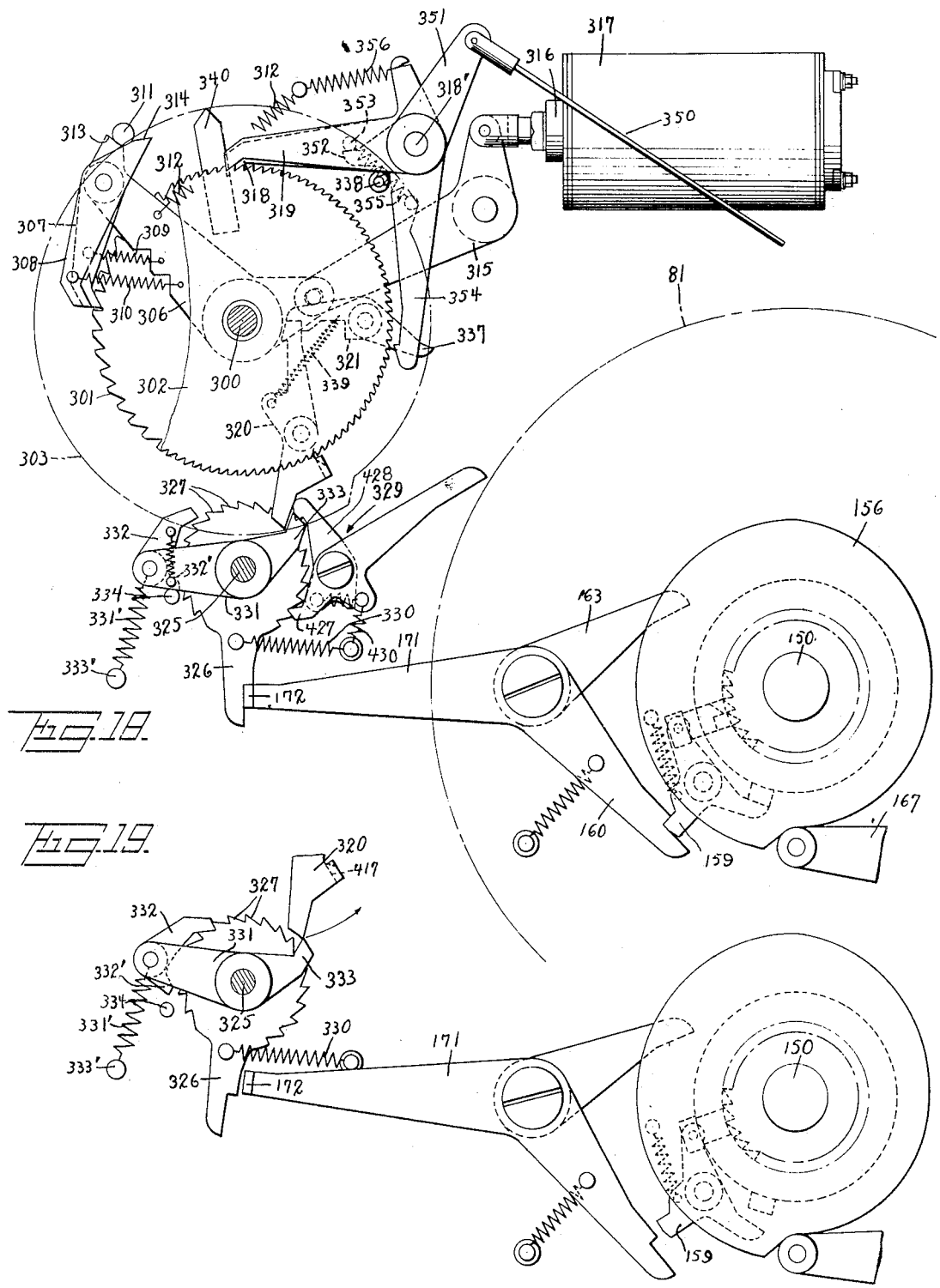
INVENTOR
H. R. Brand
BY
ATTORNEY Sept. 8, 1931.  H. R. BRAND  1,822,433
BEVERAGE PREPARING AND DISPENSING MACHINE
Filed May 11, 1928  13 Sheets-Sheet 11
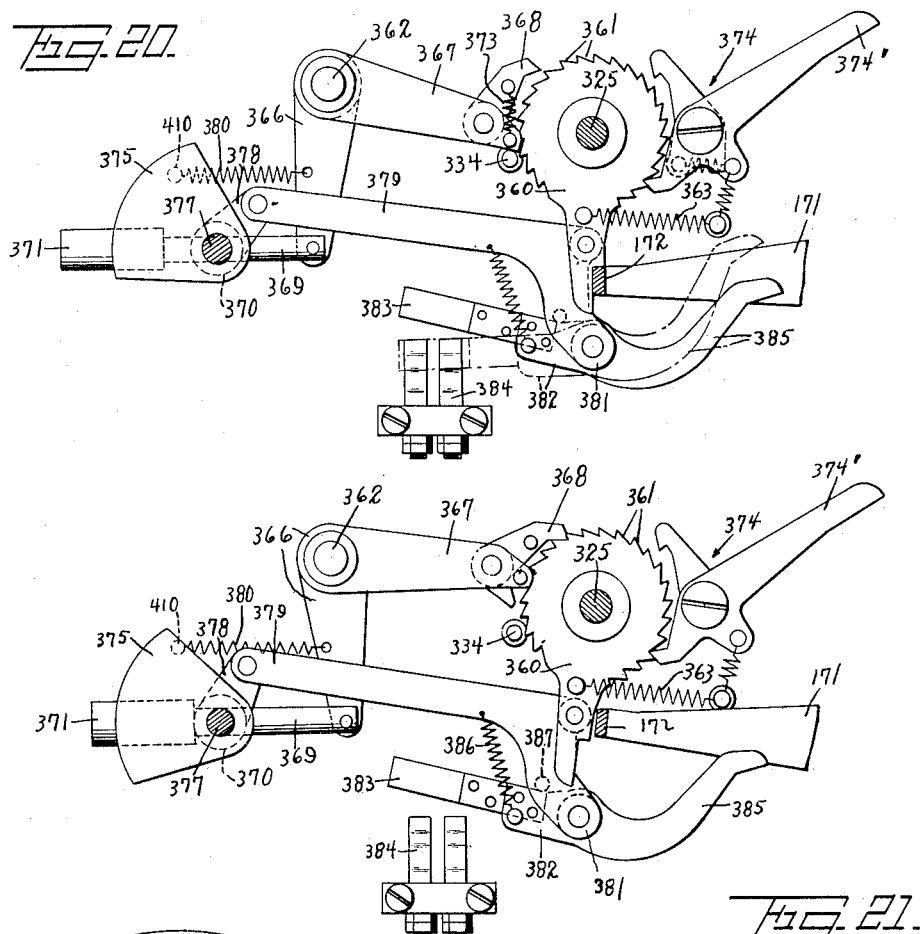
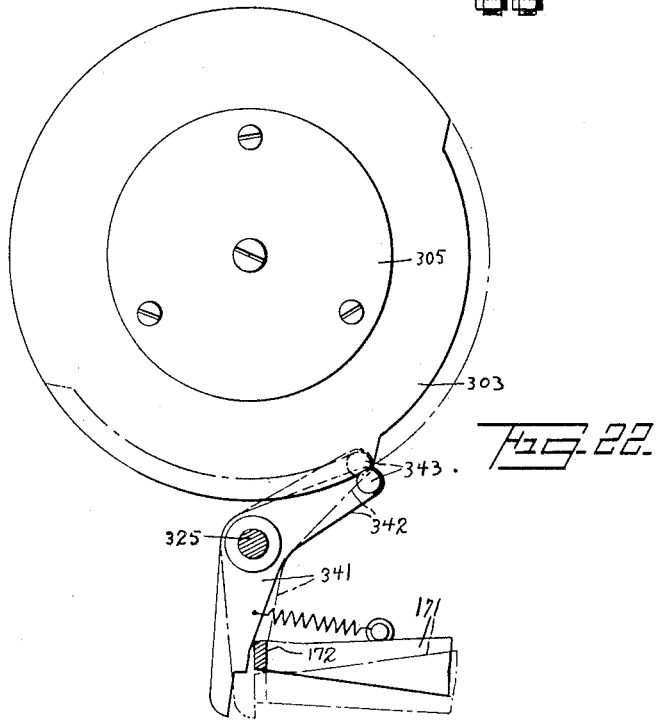
INVENTOR
H. R. Brand
BY
ATTORNEY Sept. 8, 1931.  H. R. BRAND  1,822,433
BEVERAGE PREPARING AND DISPENSING MACHINE
Filed May 11, 1928    13 Sheets-Sheet 12
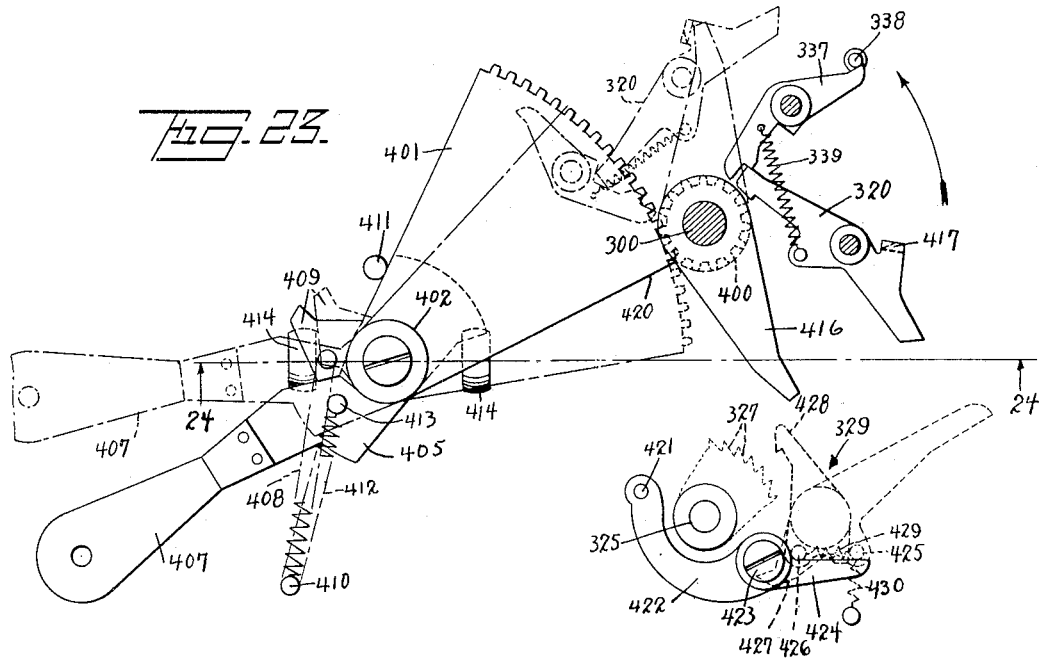
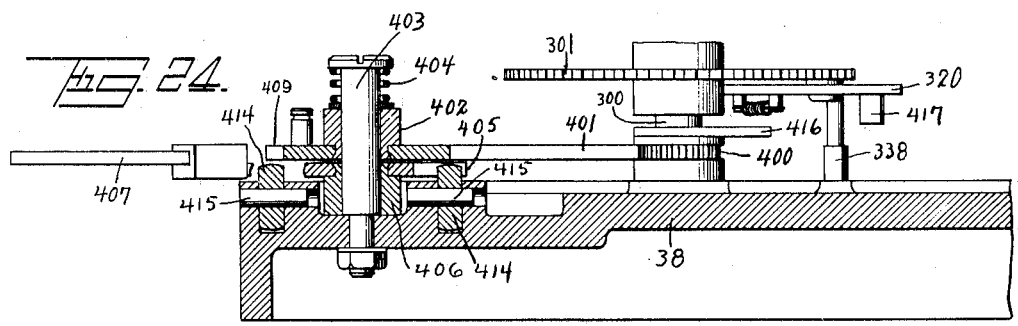
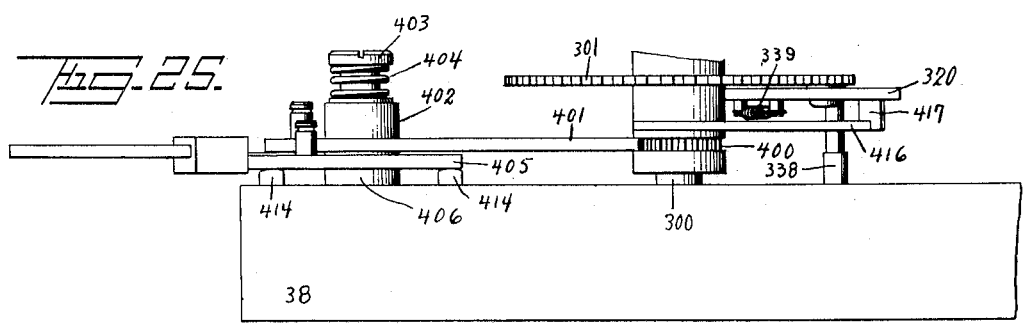
INVENTOR
H. R. Brand
BY
ATTORNEY Sept. 8, 1931.  H. R. BRAND  1,822,433
BEVERAGE PREPARING AND DISPENSING MACHINE
Filed May 11, 1928   13 Sheets-Sheet 13
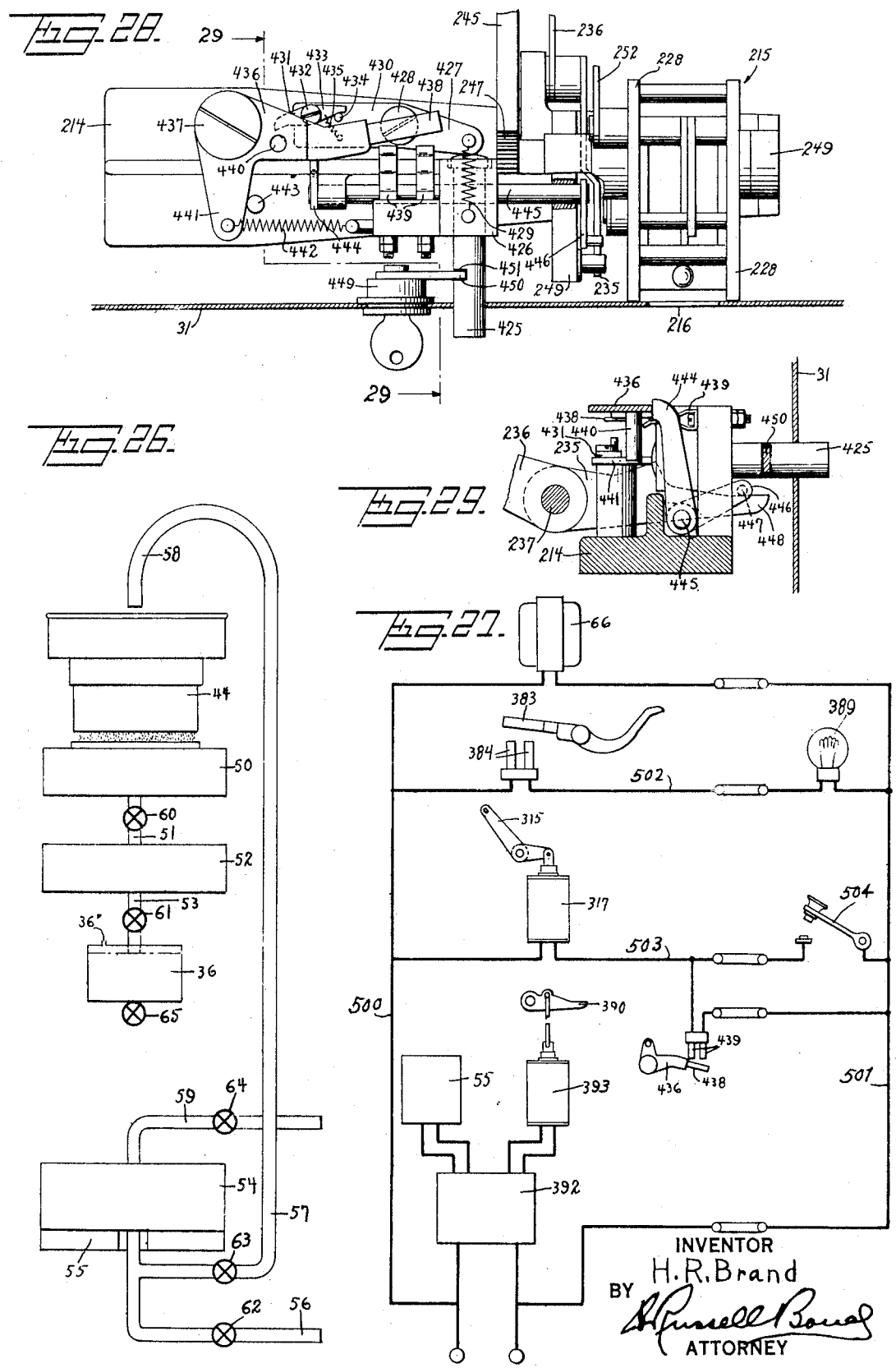

Patented Sept. 8, 1931

1,822,433

UNITED STATES PATENT OFFICE

HARRY RUSSELL BRAND, OF NEW YORK, N. Y.

BEVERAGE PREPARING AND DISPENSING MACHINE

Application filed May 11, 1928. Serial No. 277,087.

My invention relates to apparatus for preparing and dispensing beverages, and has for a specific object to provide a machine which will automatically prepare coffee in comparatively large quantities at a time, from which measured portions may be withdrawn on order or sale.

Another object of my invention is to provide a coffee preparing machine with token controlled means for dispensing predetermined measures of coffee.

Another object is to provide a coffee preparing and dispensing machine with remote controlled means for registering sales of coffee and for automatically initiating the preparation of a fresh charge of coffee when a predetermined number of sales have been registered in the machine.

Another object is to provide a machine, as described above, with means for subtracting a sales registration at each withdrawal of coffee therefrom and to prevent the preparation of a fresh charge if and while the sales registrations remaining on the machine exceed the withdrawals by a predetermined number.

Another object is to provide a coffee preparing machine having a percolator magazine in which a plurality of percolators (each charged with a measured amount of ground coffee) may be carried, the machine being further provided with means for automatically and successively bringing the percolators into operative position and with means for passing a measured amount of hot water through the percolator thus positioned, to prepare a charge of coffee.

Another object is to provide means for automatically heating the water to a predetermined temperature and for preventing actuation of the coffee preparing mechanism until the water has been raised to such temperature.

Another object is to prevent actuation of the coffee preparing mechanism when the store of percolators in the magazine has been exhausted.

Another object is to provide a signalling means which will be operated to attract the attention of an attendant when the store of percolators in the magazine has been exhausted.

Another object is to provide the machine with dispensing means adjustable to regulate the measure of coffee dispensed.

Another object is to provide auxiliary control means for dispensing coffee without the use of tokens, and a lock for preventing unauthorized use of such control means.

With these and other objects in view, which will appear hereinafter, I shall now describe a preferred embodiment of my invention in connection with the accompanying drawings and will thereafter define the novelty and scope of my invention in the appended claims.

In the drawings,

Fig. 3 is a top plan view of the machine;

Fig. 4 is a fragmentary view in section taken on the line 4—4 of Fig. 3;

Fig. 5 is a view in transverse section taken on the line 5—5 of Fig. 2;

Fig. 6 is a view in section of certain valve details of the machine;

Fig. 7 is a fragmentary side view of a valve operating mechanism and clutch therefor;

Fig. 8 is a bottom plan view of the clutch shown in Fig. 7;

Fig. 9 is a view in vertical section of a dispensing reservoir and associated dispensing mechanism;

Fig. 10 is a view in vertical section of a token receiver;

Fig. 11 is a detail view of a Geneva drive used in the dispensing mechanism;

Fig. 12 is a view in section of the valve operating mechanism, the section being taken substantially on the line 12—12 of Fig. 5;

Fig. 13 is a view in section taken on the line 13—13 of Fig. 9;

Fig. 14 illustrates certain actuating mechanism associated with the token receiver.

Fig. 15 is a plan view of certain control mechanism associated with a timing disk, which in turn controls the making of a batch of coffee, the view being an enlargement of a portion of Fig. 5.

Fig. 16 is a view in section taken substantially on the line 16—16 of Fig. 5;

Fig. 17 is a view in section taken on the line 17—17 of Fig. 5;

Fig. 18 is a view of the order registering mechanism, being a section taken substantially on the line 18—18 of Fig. 17;

Fig. 19 is a fragmentary view of certain parts of Fig. 18, shown in a different position;

Fig. 20 is a detail view of certain locking mechanism controlled by the percolator magazine, being a section taken substantially on the line 20—20 of Fig. 16;

Fig. 21 is a view similar to Fig. 20 but with certain parts in a different position;

Fig. 22 is a detail view of a cam lock for the timing disk;

Fig. 23 is a detail view of a trigger-setting machanism.

Fig. 24 is a view in section taken on the line 24—24 of Fig. 23;

Fig. 25 is a side view of the trigger-setting mechanism;

Fig. 26 is a schematic view showing the process of preparing a supply of coffee;

Fig. 27 is a diagram of certain electrical connections employed in the machine;

Fig. 28 is a plan view of an auxiliary mechanism for controlling the dispensing valve; and Fig. 29 is a view in section taken on the line 29—29 of Fig. 28.

Figure 1:
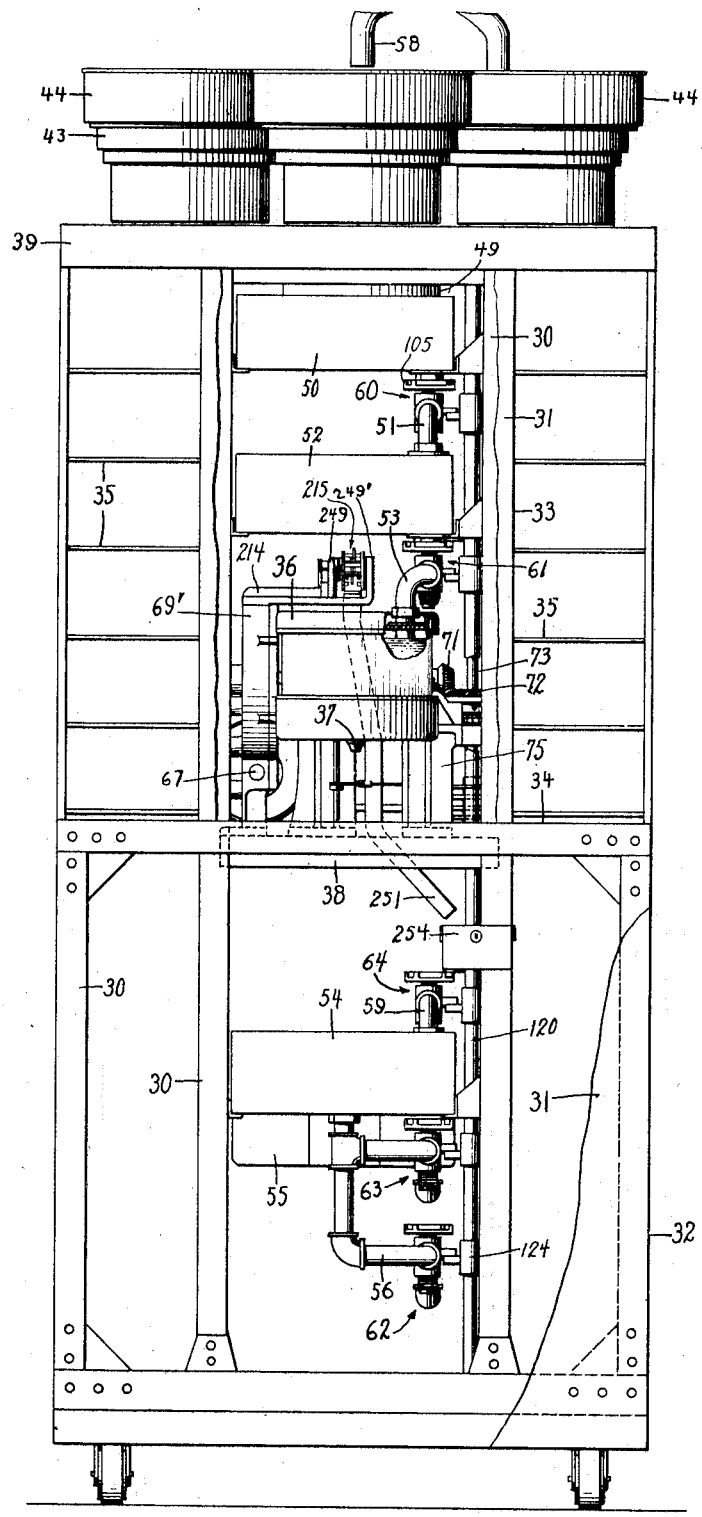
Fig. 1 is a front elevation of my improved coffee percolating and dispensing machine partly broken away to illustrate interior details.

Before proceeding with a detailed description of the particular embodiment illustrated, the following general survey may be found useful, it being understood that this survey is to be taken as illustrative and not limitative of my invention.

It is contemplated that a cashier, by depressing a key, issues a token and closes an electric circuit. The customer deposits the token in the machine, which thereupon dispenses to him a cup of coffee.

The closing of the electric circuit initiates operation of the machine to prepare a batch of coffee, causing the delivery of a predetermined quantity of water, which may be preheated, to a heating reservoir, where the water is automatically heated to a predetermined temperature.

Upon reaching this temperature the hot water is delivered (forced by steam or compressed air) to one of a series of percolators, in each of which has been placed a measured quantity of ground coffee.

The coffee thus prepared filters through the percolator into a mixing tank, (to prevent variation in the strength of small quantities or measured orders of coffee dispensed one cup full at a time). An automatically controlled mixing tank valve is operated after a predetermined interval to permit the coffee to flow from the mixing tank into a storage reservoir, from which it flows as needed into a dispensing reservoir, where a constant level is maintained, withdrawals therefrom being compensated by further supplies from the storage reservoir.

The dispensing reservoir is provided with a delivery valve, which is actuated by the deposit of the proper token in the machine to dispense a measured quantity (one cup) of coffee to the customer, who, in the present instance, places an empty cup beneath the delivery valve before depositing his token in the machine.

The machine is provided with an auxiliary dispensing actuator in the form of a push button, which may be locked out of operation if desired, or may be used instead of a token to cause the machine to dispense a cup of coffee.

The machine is provided with a percolator magazine carrying a plurality of percolators, which are individually successively brought into position at the proper times to receive the measured quantities of hot water in order to prepare fresh charges of coffee as the machine requires fresh supplies.

As each token is issued by the cashier, an order for coffee is registered in the machine; and as each order is dispensed by the machine, it is subtracted from the number of sales accumulations or orders for coffee which have been registered.

In order to have a fresh supply of coffee ready before the first charge has become completely exhausted, the machine is provided with mechanism for automatically bringing a fresh percolator into position and initiating the preparation of a fresh supply of coffee, and this mechanism is called into action when a predetermined number of orders for coffee have been registered in the machine, that is, when a predetermined number of coffee tokens have been issued by the cashier.

Since the customers may be slow in depositing their tokens in the machine and withdrawing coffee therefrom, the preparation of a fresh supply of coffee before there is room for it would flood the machine; consequently mechanism is provided for preventing the preparation of another percolator of coffee until a predetermined number of orders of coffee have been dispensed from the preceding charge. This mechanism prevents such preparation so long as the sales registrations (orders for coffee) exceed the orders actually dispensed by a predetermined number.

Safety mechanism is provided for preventing actuation of the machine to deliver hot water to a percolator until the water has been heated to the predetermined temperature.

Additional safety mechanism is provided for locking the machine against delivering to a percolator its supply of hot water when the store of percolators in the percolator magazine has become exhausted. This mechanism permits the machine to operate when the percolators have been re-supplied with fresh charges of ground coffee, and is unlocked, or released to permit the machine to operate, by an attendant who pushes a button when he has re-supplied the percolators with fresh charges of ground coffee.

The machine is provided with a signalling device, to notify the attendant when all the percolators in the magazine have been used, so that he may re-supply the magazine.

The machine is also provided with an indicating device, which indicates at all times the number of percolators in the magazine that have been used, so that the attendant may known how much coffee the machine will prepare before fresh charges of ground coffee must be supplied to the percolators.

Figure 2:
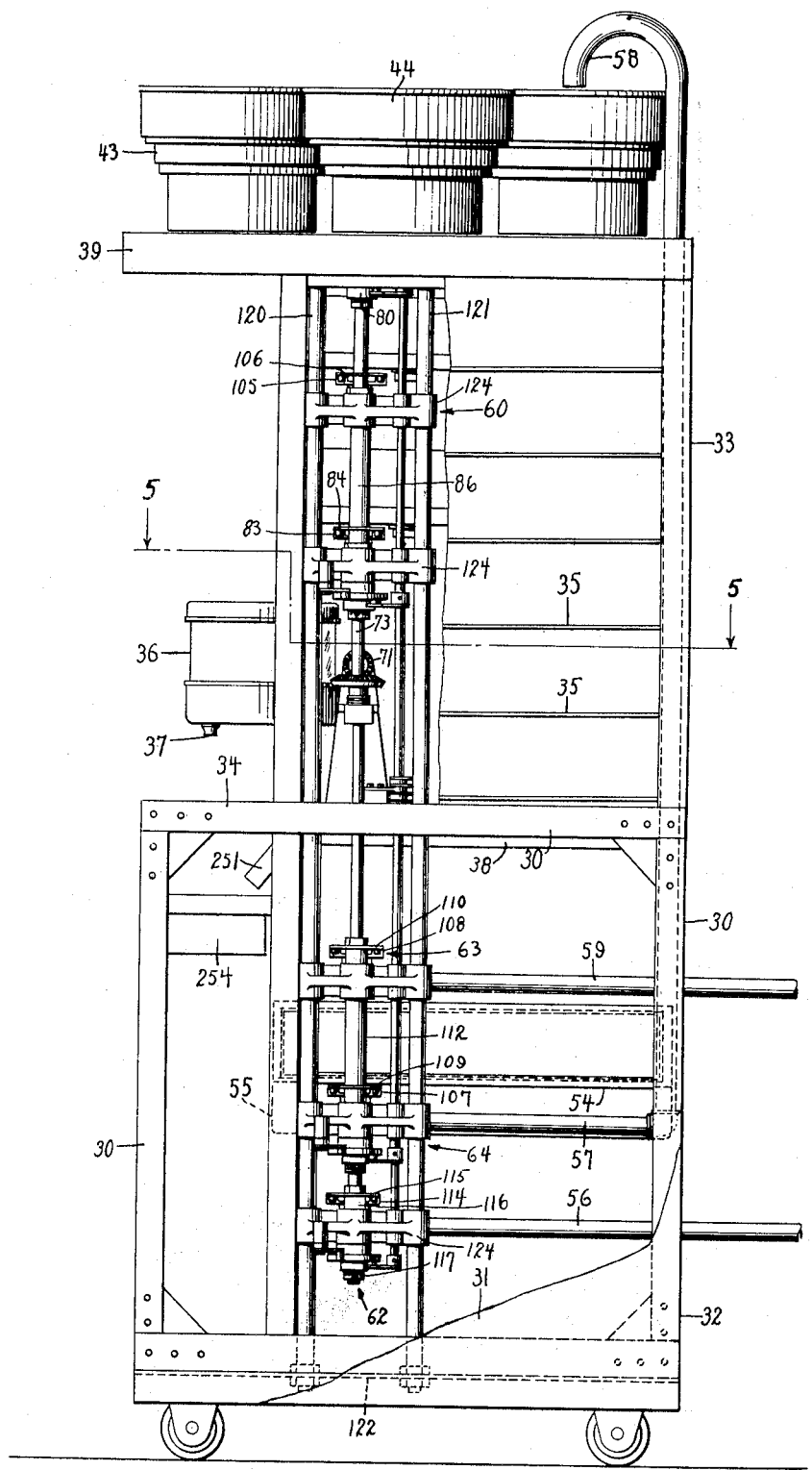
Fig. 2 is a side elevation of the same, also partly broken away.

Proceeding now with a detailed description of my invention as illustrated in the drawings, the body of my improved machine comprises a number of frame members 30 which support walls 31 of sheet metal, forming a rectangular boxlike base 32 and a super-posed casing 33 which houses most of the moving parts of the machine. The casing 33 is not as deep as the base and is rearwardly offset with respect to the base, as best shown in Fig. 2, to form a shelf 34. The casing 33 is also narrower than the base and is provided at each side with shelves 35 on which cups and saucers may be stored.

Projecting through the front wall of the casing 33 is a dispensing reservoir 36 having a spout 37 through which coffee may be drawn off into a cup supported on the shelf 34.

A base plate 38 is supported by the frame member 30 at the top of the body portion 32 and this plate carries most of the control mechanism of the machine. At the upper end of the casing 33, there is a top plate 39 which at its center provides a bearing for a shaft 40 (Fig. 3). Fixed upon this shaft is the hub 41 of a spider 42. The latter is formed with four socket members 43 in which coffee percolators 44 are supported.

The percolators may be of any suitable type. The particular type shown in the drawings is one that may be found on the market and for which I make no claim. As best shown in Fig. 4, it consists of a stepped receptacle closed at the top by a lid 45 and at the bottom by a filter 46, while a perforated partition 47 rests on the upper step of the receptacle. In service, a measured quantity of ground coffee is placed in the receptacle on the filter 46 and hot water is then poured through an opening 48 in the lid. The water is uniformly distributed by the partition 47 and percolates through the ground coffee, dripping out of the bottom of the receptacle while the filter 46 holds back the coffee grounds.

Hereinafter, the term "coffee," unless otherwise qualified, will be understood to mean the extract obtained after passing hot water through ground coffee bean.

In my machine, only one percolator is used at a time. The percolator from which the coffee is to be extracted, is adjusted to such position that the lower end thereof will register with a spout 49 in the top plate 39. This spout leads into a mixing tank 50. A pipe 51 leads from the tank 50 to a storage tank 52 (see Fig. 1), and a pipe 53 leads from the latter tank into the dispensing reservoir 36.

In the base portion of the machine is located a hot water tank 54 and a heater 55 for heating the tank 54. Water is fed into the tank 54 through a pipe 56 and a stand-pipe 57 (see Figs. 2 and 26) leads from the pipe 56 to the top of the machine where it terminates in a goose neck 58. The latter registers with the opening 48 in the particular percolator which at the moment is positioned over the spout 49. Through this stand-pipe, water is discharged from the tank 54 into the percolator by means of steam or air pressure introduced into the tank 54 through a pipe 59.

*Process of preparing a batch of coffee*

The process of preparing a batch of coffee is best illustrated in Fig. 26. It will be observed that the pipes 51, 53, 56, 57 and 59 are respectively provided with valves 60, 61, 62, 63 and 64, while the reservoir 36 has a dispensing valve 65. Assuming that the tanks are all empty, the valves are all closed, and a measured quantity of ground coffee has been placed in the percolator, the first step in producing a batch of coffee is to open the valve 62 which leads hot water into the tank 54 through the pipe 56. This water is preferably preheated to a certain temperature before being introduced into the tank, and after entering the tank, it is raised to a predetermined temperature, preferably below the boiling point of water, by the heater 55. When the requisite temperature has been reached, the valve 62 is closed and valves 63 and 64 are opened, so that water will be forced up the stand-pipe 57 by air or steam pressure introduced through pipe 59, and it will be discharged through the goose neck 58 into the percolator 44. After the water has thus been transferred to the percolator, the valves 63 and 64 are closed. From the percolator, the water drips through the ground coffee into the mixing tank 50.

Obviously, the percolator will yield a more concentrated extract in the initial flow of water than in the final drippings, and hence it would not do to use the coffee as it discharges from the percolator. Instead, the extract is caught in the tank 50 where it is retained long enough to form a uniform solution representing the average extract from the percolator. From this tank the coffee is then discharged into the storage tank 52 by opening the valve 60, after which the valve 60 is closed and the valve 61 is opened to permit the extract to flow into the dispensing reservoir 36.

It is important that a uniform head of coffee be maintained in the dispensing reservoir so that the amount of coffee drawn off at each operation of the dispensing valve 65 may be measured by the time during which the valve is open. A uniform head of coffee is maintained by having the pipe 53 penetrate to a certain depth in the reservoir 36, as best shown in Fig. 1. Inasmuch as the valve 60 is closed when the coffee is being dispensed, there will be no means of supplying the tank 52 with air to replace the coffee withdrawn therefrom except from the dispensing reservoir 36 up through the pipe 53. Air enters the reservoir 36 through a vent 36' in the top-wall of said reservoir. Thus, after sufficient coffee has flowed into the reservoir 36 to seal the lower end of the pipe 53, a further flow of coffee into the reservoir will be interrupted, only to be resumed intermittently as withdrawals from the reservoir 36 uncover the lower end of the pipe 53 and permit more air to bubble up through pipe 53 into the tank 52.

*Valve operating mechanism*

Obviously, coffee could be made with this apparatus by operating the valves by hand. However, in my machine, all the valves controlling the percolating of the coffee and its delivery to the dispensing reservoir are mechanically operated in timed relation one to another, and mechanism is provided whereby as soon as the coffee has been extracted from one percolator, another percolator will be automatically moved into position, and when the first batch of coffee has been drawn off to a certain predetermined extent, a second batch will be prepared by a second operating of the valves, thereby maintaining a constant store of coffee in the machine.

Power for operating the valves and for maintaining the coffee percolators is supplied by a motor 66 (see Fig. 5) which is mounted on the base plate 38. This motor drives a power shaft 67 on which is fixed or integrally formed a worm 68. The latter drives a worm wheel 69 keyed upon a main drive shaft 70. A housing 69' covers the worm and worm wheel. The shaft runs transversely across the machine immediately back of the dispensing reservoir 36. A bevel pinion 71 fixed to the shaft 70 meshes with a gear 72 on a vertical clutch shaft 73. The latter, as shown in Fig. 12, is provided with a thrust bearing 74 carried by a bracket 75. The clutch shaft is also journaled at its upper end in a bearing 76 depending from the top plate 39. This shaft runs constantly at a comparatively low speed.

Mounted freely on the shaft 73 is a pinion 77 which engages an idler 78 (Fig. 3) and the latter in turn meshes with a gear 79 secured upon the shaft 40 of the spider which carries the percolators. As will be explained hereinafter, a clutch 80 (Fig. 12), controlled by a timing disk 81 (Fig. 5), is arranged to operatively connect the pinion 77 and shaft 73 so as to turn the spider at the proper moment to bring a fresh percolator into operative position. The valves 60 to 64 inclusive are also arranged to be turned by the clutch shaft 73 through suitable clutch connections controlled by the timing disk 81.

Fig. 6 shows the construction of the valve 61 which controls the flow from the storage tank 52 to the dispensing reservoir 36. This valve is typical of the valves 60, 62, 63 and 64. As shown, the valve 61 has a taper plug 82 to which is affixed a Geneva wheel 83. The wheel 83 is driven by a member 84 (Fig. 7) which comprises a pair of arms each bearing a roller at its outer end. Thus, at each half turn of the driving member 84, one of the rollers will engage the Geneva wheel and cause the latter to turn through an agle of 90 degrees.

*Clutch mechanism*

The driving member 84 is driven by the shaft 73 through a clutch which is generally referred to in the drawings by the reference numeral 85. The construction of this clutch is as follows: The driver 84 is keyed to a sleeve 86 which turns freely on the shaft 73. Secured to the shaft 73 is a clutch member 87 in the form of a collar with peripheral teeth 88 thereon. This member 87 fits within an enlarged extension of the sleeve 86. A disc cam 89 (Fig. 8) is formed on the sleeve 86, and fulcrumed on the face of the cam is a three-armed lever 90. One arm of this lever has, pivotally connected thereto, a pin 91 which passes through a radial bore 92 in the sleeve 86 and is adapted to engage the teeth 88 of the clutch member 87. Also fulcrumed on the face of the cam 89, but on the diametrically opposite side from the lever 90, is a two armed lever 94. One of the arms of the lever 94 projects radially from the cam and is in engagement with a detent 93, while the other arm of the lever projects laterally and is connected by a link 95 to a corresponding arm of the lever 90. By reason of this link connection, the two levers 90 and 94 will be oscillated in unison. The third arm of the lever 90 is normally pressed against a stop pin 90'. When the detent is withdrawn from engagement with the lever 94, a spring 96 connected at one end to the link 95 and at the other to a pin on the face of the cam 89, forces the pin 91 into engagement with the teeth 88, coupling the clutch member 87 and the sleeve 86 together so that the latter will rotate with the shaft 73. However, this rotation will be interrupted after a passage through 180 degrees because then the lever 90 will strike the detent 93, thereby withdrawing the pin 91 from the teeth 88. Upon the next withdrawal of the detent 93, the pin 91 will again be moved into clutching position only to be withdrawn after a turn of 180 degrees by engagement of the lever 94 with the detent 93.

In order to facilitate withdrawal of the pin 91 from clutching position, it is desirable to advance the sleeve 86 with respect to the clutch member 87. To this end, the cam 89 is formed with sharply inclined surfaces 97 and 98. A roller 99 carried by an arm 100 is pressed into engagement with the periphery of the cam by a spring 101 and the arrangement is such that just prior to engagement of the detent 93 with the lever 90, the roller presses against the inclined surface 97 causing the sleeve 86 to override the clutch member 87. Upon the next operation of the clutch, just before the arm 94 engages the detent 93, the roller 99 engages the inclined surface 98 causing the sleeve 86 again to override the clutch member 87, thereby relieving the pin from such frictional engagement as might cause difficulty in withdrawing it from the teeth 88.

It will be recalled that the valve 60 is arranged to be turned off at the time that the valve 61 is turned on and vice versa. Hence, the same clutch will serve to operate the two valves provided one valve is advanced 90 degrees with respect to the other. To this end, the valve 60 carries a Geneva wheel 105 (Fig. 2) which is operated by a two-armed driver 106 also keyed to the sleeve 86 (see also Fig. 12). Similarly, valves 63 and 64 are provided with Geneva wheels 107 and 108 operated by two-armed drivers 109 and 110 respectively, keyed to a sleeve 112. These two valves 63 and 64, it will be recalled, are operated together and unlike the valves 60 and 61 are not angularly advanced one with respect to the other. The sleeve 112 turns on the shaft 73 and is connected to the latter by means of a clutch 113 of the same type as the clutch 85. The valve 62 is provided with a Geneva wheel 114 operated by a two-armed driver 115 secured to a sleeve 116 which turns on the shaft 73, and a clutch 117 serves to operatively connect the shaft 73 and the sleeve 116. This clutch also is of the same type as the clutch 85.

To support the sleeves 86, 112 and 116, a pair of vertical columns 120 and 121 are arranged at each side of the shaft 73. These columns are secured at the top to the plate 39 and at the bottom to a plate 122. As shown in Fig. 5, the columns pass through a recess in the base plate 38 to which they are clamped by a strap 123. Transverse yoke members 124 are secured to the columns 120 and 121 respectively and serve to tie the columns together. These transverse members also provide journals for the sleeves 86, 112 and 116, as best shown in Fig. 12.

At one side of the clutch shaft 73, I provide a set of vertical shafts, 125, 126, 128 and 130 which are journaled in the yokes 124 and which carry the detents that release the clutches. The detent 93 is secured to the shaft 125 which is hollow and within which is fitted the shaft 126. The latter carries a detent 127 at its upper end which controls the clutch 80. This clutch 80 is of the same type as that shown in Figs. 7 and 8 except that it is not provided with the lever 94 and link 95 so that when operated, it will make a complete turn before disengaging. Alined with the shafts 125 and 126 is the shaft 128 which at its lower end carries a detent 129 adapted to control the clutch 113. Within the shaft 128, which is hollow, is the shaft 130 which at its lower end carries a detent 131 adapted to operate the clutch 117.

*Valve timing mechanism*

Secured to the adjacent ends of the shafts 125, 126, 128 and 130 are bellcranks 133, 134, 135 and 136 respectively. These bellcranks are arranged at four levels, as shown in Fig. 12, and are adapted to be engaged by fingers projecting from the timing disk 81. One of these bellcranks 133 is illustrated in the plan view in Fig. 5 and is typical of all of the bellcranks. Thus, each bellcrank has an arm which is pressed into engagement with the column 121 by a suitable spring, as indicated at 137, thereby holding the other arm of the bellcrank in position to be engaged by one of the fingers on the timing disk 81. There are seven fingers on the disc (see Figs. 5, 15 and 16). Two of these fingers, 141 and 142, are secured to but spaced from the under-face of the disk and lie in the plane of the lowermost bellcrank 136. Two of the fingers 143 and 144 are secured to but spaced from the upper face of the disk and lie in the plane of the uppermost bellcrank 133. The fingers 145 and 147 lie flat against the underface of the disk in the plane of the bellcrank 135 and a single finger 146 lies flat against the upper face of the disk in the plane of the bellcrank 134.

The timing disk 81 is mounted to turn on a shaft 150 (see Fig. 16) and fixed to this shaft is a worm wheel 151. The worm wheel is engaged by a worm 152 secured to a shaft 153 (see also Fig. 5) and the latter is driven by the shaft 70 through a suitable train of gears 154. A clutch, similar in general form, to that previously described for operating the valves, is provided for connecting the timing disk 81 to the continuously revolving shaft 150 at proper intervals. As shown in Figs. 15 and 16, the shaft 150 has a peripherally toothed clutch member 155 secured thereto. Mounted to turn on the shaft 150 is a disk cam 156 formed with an annular depending flange 157 which telescopes over the clutch member 155. This flange is radially bored to receive a pin 158 connected to a three-armed lever 159 mounted on the underface of the cam 156. The pin is held in declutching position by a detent arm 160 engaging one of the arms of the lever 159, but when the detent is withdrawn, a spring 161 forces the pin 158 into engagement with the teeth on the member 155, thereby operatively connecting the cam and the shaft 150. The timing disk 81 is attached to the cam 156 and is angularly positioned thereon by means of a pin 156'. The three-armed lever 159 is fulcrumed on a pin 162 which projects far enough to engage an arm 163 secured to or integrally connected with the detent arm 160, so that after the clutch has been engaged by withdrawal of detent 160 from the three-armed lever 159, the pin 162 will strike the arm 163 and restore the detent 160 to its original position against the action of a spring 164. In this position the arm will be held by means which will be described hereinafter, so that when the timing disk 81 has made one complete turn, the lever 159 will engage the detent 160, causing withdrawal of the pin 158 and disengagement of the clutch. As in the other clutches previously referred to, the cam 156 is provided with a sharply inclined portion adapted to be engaged by a roller 166 on an arm 167, and the latter is urged against the cam by a spring 168 so that when the parts reach the declutching position, the roller 166 by pressing against the inclined cam surface will cause the cam and associated parts to override the clutch member 155, facilitating withdrawal of the pin 158.

The arms 163 and 160 are fulcrumed on a post 170 rising from the plate 38, and are formed with an extension 171 substantially radial to the timing plate 81 and terminating at its outer end in an upturned latching bar 172. A number of latch levers are arranged in superposed relation and are adapted to engage the latch bar to prevent the detent from releasing the three-armed lever 159 until certain conditions have been met, as will be described hereinafter.

Dispensing mechanism

As shown in Fig. 9, the dispensing reservoir 36 consists of a glass cylinder with a lid 175 and a bottom casting 176 held together by a bolt 177. Preferably the lid is formed with a jacket 178 providing an air space for thermal insulation. The bottom casting 176 is also provided with a similar jacket 176' which covers the casting and mechanism associated therewith and serves to effect thermal insulation of this part of the dispensing reservoir.

The bottom casting 176 is formed with an inclined floor leading down to a port 179 which communicates with the spout 37. The dispensing valve above referred to generally by the reference numeral 65 includes a tapered plug 180 fitted in a transverse tapered valve seat and controlling the opening 179. This plug is pressed into its seat by a spring 181. A horizontal shaft 182 journaled at one end in the casting 176 and at the other in a bracket 183, is formed with a flattened end which engages a slot in the plug 180, thus an operative connection is established between the shaft 182 and the plug 180. At the opposite or outer end of the shaft is a Geneva wheel 184 keyed thereon. This Geneva wheel, as shown in plan view in Fig. 11, is driven by rollers 186 carried by a driving member 187 secured to a pinion 188. The latter in turn is mounted to rotate freely on a stud 189 carried by the bracket 183. As shown in Fig. 11, the rollers 186 are not diametrically opposed, but bear such angular relation to each other that when the Geneva wheel has been rotated through a quarter of a turn by one of the rollers, there will be a pause of more than half a turn of the driver before the next roller engages the Geneva wheel and produces a second quarter turn thereof. The first quarter turn of the Geneva wheel, as above described, will result in turning the plug 180, thereby opening valve 65 and causing the discharge of coffee from the dispensing reservoir 36, and the second quarter turn will close the valve. The relative timing is such that the valve will be opened just long enough to fill a cup with coffee provided a uniform head is maintained in the dispensing reservoir 36.

The pinion 188 meshes with a miter pinion 190 mounted to turn freely on a shaft 191. The latter is journaled below the main driving shaft 70 and is driven by the main drive shaft 70 through a train of gears 192. As indicated in Fig. 13, this gear train includes an idler 193 mounted on a link 194 which may be angularly adjusted to engage change gears 195 of different diameters, thereby varying the speed of rotation of shaft 191 with respect to shaft 70 and providing a means of regulating the amount of coffee that will be discharged at each operation of the dispensing valve. The pinion 190 is arranged to be operatively connected with the shaft 191 by means of a clutch 196 similar in form to those previously described.

The clutch 196 is clearly shown in Figs. 9 and 13 and needs no specific description except to point out that it carries a three-armed lever 197 which is engaged by a detent 198 fulcrumed on a pin 199 carried by the bracket 183. The clutch also includes a disk cam 200 which is actuated by a spring pressed roller 201 to cause the driven parts to override the driving parts to effect ready disengagement of the clutch. On the cam 200 is a pin 202 which is adapted to engage an arm 203 connected to the detent arm 198 so as to return the latter to clutch-engaging position against the action of a spring 204. The detent arm 198 is held in this position by a locking lever 205 which engages a lug 206 on the detent. The lever 205 is fulcrumed on a pin 207 carried by the bracket 183. A spring 208 tends to hold the locking lever 205 in engagement with the lug 206. An arm 211 of the locking lever 205 has a pull rod 212 attached thereto. By pulling this rod the detent is released from the locking lever and is disengaged from the three-armed lever 197 by the spring 204 thus allowing the clutch 196 to make one revolution, and through the associated mechanism, causing the dispensing of a cup of coffee by the partial rotation of the tapered plug 180.

*Token control of the dispensing mechanism*

The clutch 196 is controlled by inserting a token in a token receiver 215 (see Figs. 9, 10, 14 and 28). The token receiver may be of any suitable type which would respond to a token of characteristic form. In the drawings, I show the token receiver adapted to receive a token consisting of a metallic plate formed with a characteristic combination of perforations. The token and receiver are similar to the kinds described in my co-pending applications Serial No. 204,325, filed July 8, 1927, and Serial No. 268659, filed April 9, 1928.

The token receiver is supported on a bracket 214 mounted on the worm wheel housing 69' (Figs. 1 and 5). In the front wall 31 (Fig. 14) of the casing 33, just above the dispensing reservoir 36, there is a token slot 216 which is alined with a guide way 217 (Fig. 10) in the token receiver when the latter is in normal position. When the token is inserted in the guideway it comes up against one arm 218 of a bellcrank lever 219, the other arm of which is connected by a spring 220, to the frame of the token receiver. The bellcrank lever 219 turns freely on a shaft 221 and fastened upon this shaft is a second lever 222 one arm of which is connected to the arm 219 by a spring 223, being held by said spring against a stop 224 on the lever 219. The other arm 225 of said second lever 222 is bifurcated to engage a pin 226 on a slide member 227. The latter has sliding engagement with side plates 228 of the token receiver, so that it may be moved toward and from the guide 217. The slide member 227 carries a plate 229 formed with projecting pins 230. Thus, when a token is inserted in the guide 217 and pressed against the arm 218, the pressure is transmitted through the spring 223 to the arm 222 causing the member 227 to move forward or toward the guide way 217. If a wrong token has been inserted into the token receiver, i. e., one whose perforations do not correspond in number and relative location to the pins 230, the latter will strike the body of the token, limiting movement of slide member 227, and at the same time the shaft 221 will be given but a limited rotary motion. Then, on releasing the token, the spring 220, acting through the arm 218 will eject the token from the guideway 217. If, however, a proper token has been inserted, the pins 230 will enter and pass through the perforations in the token, thereby locking the token in the guideway. At the same time, the shaft 221 will be turned sufficiently to effect certain operations which will now be described.

As shown in Fig. 14, the shaft 221 projects through one of the side plates 228 of the token receiver and the projecting part carries a lever 231 fixed thereto. This lever has pin and slot connection 232 with one arm of a bellcrank 233, pivoted on said side plate 228. The other arm of the lever 233 carries a pin 234 adapted to be swung into the path of an arm 235 of a lever 236. The latter is pivoted on a stud 237 carried by the bracket 214 and is connected to the upper end of the rod 212. Thus, when a proper token is inserted in the token receiver and pressed against the arm 218, the shaft 221 will turn far enough to force the pin 234 against the arm 235, depressing it and pulling up the rod 212. This, as explained above, results in throwing the clutch 196 and actuating the dispensing valve 65.

As shown in Figs. 13 and 14, the cam 200 is fixed upon a sleeve 239 and secured to this sleeve is a second cam 240 against which bears a roller 241. This roller is mounted on one arm of a lever 242 which turns freely on the pin 199. The other arm 243 of the lever is connected by a rod 244 to a crank arm 245 of a gear segment 246. The latter is pivoted to turn freely on the stud 237 and meshes with a pinion 247 fast on a shaft 248, to which the sidewalls 228 of the token receiver are secured. This shaft passes through bearings, in arms 249 and 249' of the bracket 214. A spring 250 is anchored at one end to the arm 249 and at the other end to the segment 246. This spring serves to hold the roller 241 against the cam 240. The latter is of such profile as to turn the segment on its axis against the tension of the spring 250, thereby turning the pinion 247 and with it the shaft 248, and causing the entire token receiver to turn with the shaft 248 until the guideway is alined with a chute 251 (see also Figs. 5 and 9). Just as the token receiver reaches this position, an arm 252 of the lever 231 strikes a pin 253 on the bracket arms 249, causing the shaft 221 to turn backward and thereby withdrawing the pins 230 (Fig. 10) from engagement with the token. The latter will then be ejected by the arm 218 under impulse of the spring 220 and will discharge into the chute 251. This chute leads into a token box 254 (Fig. 2) at the front of the machine, which is locked so as to be accessible only to an authorized party. After the token is discharged, the spring 250 restores the parts to the normal position shown in Fig. 14.

*Mechanism for registering sales and deliveries*

The preparation of a batch of coffee is initiated by closing an electric circuit (as will be explained more fully below) and thereafter a registration is made in the machine, as each token is sold, so that when a predetermined number of sales have been made, another batch of coffee will be prepared. In addition to the sales registering mechanism, there is another registering mechanism which keeps track of the cups of coffee dispensed so as to prevent the sales of tokens from getting so far ahead of the deliveries of coffee that a second batch of coffee will be made too soon and thereby flood the machine. These two registering devices are shown to best advantage in Figs. 17 and 18.

Mounted to turn freely on a shaft 300 adjacent to the timing disk 81, are two ratchet wheels 301 and 302. As shown in Fig. 18, there are twice as many ratchet teeth in the wheel 302 as in the wheel 301. The wheel 302 has a disk cam 303 secured thereto. A spiral spring 304 connected at one end to the shaft 300 and at the other to the cam 303 tends to turn the latter and the wheel 302 clockwise, as viewed in Fig. 18. A housing 305 covers the spring 304. Mounted to turn freely on the shaft 300, between the ratchet wheels 301 and 302, is a bellcrank lever 306 on which are fulcrumed two pawls 307 and 308. The latter are urged into engagement with wheels 301 and 302 respectively by springs 309 and 310. The pawl 307 is normally in engagement with the wheel 301, while the pawl 308 is normally held out of engagement with the wheel 302 by a stop pin 311 against which an inclined rearward extention 314 of the pawl 308 is held by the pull of a spring 312 on the bellcrank 306. The bellcrank has a shoulder 313 which abuts against the stop pin 311 and maintains the bellcrank in the position illustrated. The latter has a pin and slot connection with one arm of a bellcrank 315, the other arm of which is pivotally connected to a plunger 316 of a solenoid 317. When the solenoid is energized, the bellcrank 306 is oscillated against the pull of the spring 312, and through the pawl 307 feeds the ratchet wheel 301 counter-clockwise through an angle corresponding to a tooth spacing of said ratchet wheel. In the meantime, the pawl 308 moves through an angle of two tooth spacings of the ratchet wheel 302, but will turn the latter wheel through only one tooth spacing thereof because the cam 314 and stop 311 coact to hold the pawl 308 out of engagement with the wheel 302 until the pawl has cleared one tooth of the latter wheel. Thus, at each actuation of the solenoid, each ratchet wheel will move through an angle of one of its tooth spacings, but the angular movement of the ratchet wheel 302 will be half that of the ratchet wheel 301. A pair of dogs 318 and 319 serve to hold the ratchet wheels 301 and 302 respectively from turning backward when the lever 306 is withdrawn by the spring 312.

Pivoted on the underface of the ratchet wheel 301 is a trigger lever 320 which has one arm projecting beyond the periphery of said ratchet wheel while the other arm is normally engaged by a latch lever 321 also pivotally secured to the under side of the wheel 302. The purpose of the trigger lever will be explained presently.

*Automatic release of timing disk clutch*

Mounted on a stud 325 adjacent the ratchet wheel 301 is a latch arm 326 adapted to engage the latch bar 172 on the arm 171 that controls the timing disk clutch. The hub of the latch lever 326 is formed with peripheral ratchet teeth 327 engaged by an escapement 329. A spring 330 urges the latch lever counterclockwise against the locking bar 172 and against the escapement 329. Pivoted on the stud 325 is a two-armed lever 331, one arm of which carries a spring pressed pawl 332, while the other arm 333 lies in the path of the projecting arm of the trigger lever 320. Normally, the pawl 332 is held out of engagement with the ratchet teeth 327 by a stop pin 334 engaging with a lug 332' of the pawl, but when said pawl is withdrawn from the stop pin by motion of arm 331, the pawl engages one of the teeth 327 which turns the latch arm 326 clockwise.

Fig. 18 shows the parts in their normal position just before the machine is started. When the solenoid 317 is energized, the ratchet wheel 301 is advanced counter-clockwise through an angle of one tooth spacing, and this carries the trigger lever 320 from the position shown in Fig. 18 to just past that shown in Fig. 19, thus oscillating the lever 331, and, through the pawl 332, swinging the latch arm 326 clear of the bar 172. The lever 331 is returned to the position shown in Fig. 18 by a spring 331' fastened between it and a stud 333'. Thus, if the bar 172 is not held by any other latch arm, the detent 160 will swing clear of the three-armed pawl 159 permitting engagement of the clutch which connects the timing disk to the constantly rotating stud 150. This will initiate the preparation of a batch of coffee. Subsequent energizings of the solenoid 317 will advance the ratchet wheel 301 step by step until a projecting arm 337 of the latch lever 321 strikes a fixed pin 338 (see Fig. 23), whereupon the tension of the spring 339 connecting the trigger 320 and the latch lever 321 will swing the two apart to the position illustrated by broken lines in Fig. 23. The trigger is thus retracted so that it will not again engage the arm 333 until reset by a mechanism which will be described hereinafter. However, there is a finger 340 secured to the ratchet wheel 301 at a point diametrically opposite the trigger lever when the latter is in projected position, so that when the ratchet wheel 301 has rotated through an angle of approximately 180 degrees, the arm 333 will be engaged and oscillated by the said trigger finger 340 in place of the trigger lever 320.

In the particular embodiment of my machine illustrated in the drawings, the wheel 301 is formed with 50 ratchet teeth so that it takes 50 actuations of the solenoid 317 to produce one complete rotation of the wheel 301. As some time is required to prepare a batch of coffee, it is not advisable to sell all the coffee produced by one percolator before starting the second; hence, I have arranged to provide a reserve of about half a percolator full, or say 25 cups of coffee. This reserve, of course, may be varied at will by adjusting the position of the finger 340. It is for the purpose of providing a reserve that the trigger lever 320 is used to initiate the preparation of a batch of coffee in the first percolator. When orders have been transmitted to the machine for 25 cups, or half of the first batch, the preparation of the second charge is initiated by the finger 340. Thereafter, the preparation of the third charge will be initiated when 50 more cups of coffee have been sold and the fourth charge when still another lot of 50 cups have been sold, but as each percolator is started, there will be thus a reserve of 25 cups from the previous batch which may be drawn upon while the new batch of coffee is being prepared.

*Means for preventing flooding of the machine*

Means are provided for preventing the preparation of coffee in excess of the capacity of the machine should customers be slow to draw the cups of coffee they have ordered. This means includes the ratchet wheel 302 and cam 303 attached thereto. A latch arm 341 (see Figs. 15, 16, and 22) is pivotally mounted on the shaft 325 above the latch 326. An arm 342 integral with the arm 341 carries a roller 343 which bears against the cam 303. The arm 341 is normally held thereby out of engagement with the latch bar 172. As embodied, the latch arm 341 is held inoperative while the ratchet wheel 301 makes three quarters of a turn, or in other words, while 75 orders of coffee are received by the machine without a single withdrawal, but as each cup of coffee is withdrawn, the ratchet wheel 302 is set back one tooth spacing by a mechanism which will be described hereinafter. When the orders exceed the withdrawals by more than 75, the roller 343 rides down to an arc of shorter radius on the cam, under impulse of a spring 344, thereby locking the bar 172 so that the timing disk 81 cannot be turned and no more coffee will be extracted until the margin of unfilled orders is reduced.

The mechanism for setting back the ratchet wheel 302 at each withdrawal, is illustrated in Figs. 9, 15 and 18. Pinned to the dispensing valve shaft 182 is a face cam 345 against which bears a roller 346. The latter is carried by a crank 347 fixed upon a vertical shaft 348. A second crank 349 fixed upon the shaft 348 is connected by a rod 350 to a crank arm of the three-armed lever 351 (Figs. 15 and 18). The lever 351 is journaled on the pin 318' and has a second arm 352 which bears against a pin 353 carried by the dog 319. Thus, at each one-half turn of the shaft 182 to dispense a cup of coffee, the dog 319 is lifted, permitting the ratchet wheel 302 to turn backward or clockwise under the impulse of the spiral spring 304. This retrograde motion however is limited to one tooth spacing by an escapement dog 354 which forms the third arm of the lever 351. A tension spring 355 ties the pawl 319 to the dog 354 and a spring 356 holds the pawl 318 against the escapement teeth of the ratchet 302. The spring 356 thus holds the roller 346 against the cam 345 and the spring 355 permits the dog 354 to ratchet over the teeth of the wheel 302 should the solenoid drive the wheel forward at the same time that the escapement is being actuated by the cam 345.

Magazine control of timing disk clutch

In addition to the two latch arms above referred to, there is a third latch 360 (Figs. 16, 20 and 21) pivoted on the stud 325, which serves to engage the latch bar 172 when the last of lot of percolators has been operated, so as to prevent rotation of the timing disk 81 until a fresh lot of percolators had been installed in place of the spent ones.

The hub of the latch arm 360 is formed with ratchet teeth 361. Mounted on a pin 362 adjacent the stud 325 is a bellcrank 366, one arm 367 of which carries a pawl 368 adapted to engage the teeth 361. The other arm of the bellcrank is pivotally connected to one end of a rod 369 which slides in a bearing formed in a vertical stud 370 (see Fig. 16). The opposite end of the rod carries a button 371 which projects through an aperture in the rear wall 31 of the casing 33. By pressing this button, the bellcrank 362 is swung on its axis from the position shown in Fig. 20 to that shown in Fig. 21 and the pawl 368 which is normally held clear of the teeth 361 by the stop pin 334 coacting with a lug 372 of the pawl, is drawn by the spring 373 into engagement with the teeth 361, swinging the arm 360 away from the latching position against the tension of the spring 363. Each operation of the button turns the arm 360 through one tooth spacing and the arm is held against retrogression by an escapement 374. The latter has an arm 374' which extends towards the timing disk 81 in position to be engaged by a pin 145' depending from the finger 145 so that at each turn of the timing disk, the escapement will be operated to permit the arm to move backward under tension of the spring 363 through one tooth spacing until it returns to the latching position. The pallets of the escapement 374 are resiliently connected as indicated in the drawings so as to yield in case of simultaneous actuation of the arm 374' and depression of the button 371.

In operation, an attendant will depress the button once for each spent percolator he replaces and an indicator is provided to show the attendant how many times the button has been depressed. This indicator is in the form of a segment 375 (Figs. 16, 20 and 21) which shows through an aperture 376 in the rear wall of the casing. The segment is fixed upon a vertical shaft 377 which is supported in suitable bearings in alinement with the stud 370. A crank arm 378 fixed to the shaft 377 is pivotally connected to one end of a bar 379, the other end of which is pivotally connected to the arm 360. Thus, as the latter is rotated by depressing the button 371, the segment 375 will be rotated through the bar 379 and the crank 378. The segment 375 may be provided with suitable indicia on the periphery thereof so that an attendant may see that the mechanism controlled by the button 371 has been properly operated. The mechanism also enables him to see at any time how many used percolators there are in the machine because at each turn of the timing disk the segment will be turned backward with the arm 360. A spring 380, one end of which is connected to the bellcrank arm 366 and the other end to the stud 410 fixed in the base 38, serves to return the button 371 after each depression thereof.

The bar 379 is provided with a laterally projecting arm 381 on which is pivoted a contact lever 382. One arm of this lever carries a contact blade 383 suitably insulated from the lever and adapted to be swung into engagement with a pair of electric terminals 384. The other arm 385 of the contact lever extends toward the timing disk 81 in the plane of a pin 142' depending from the finger 142. A spring 386 holds the contact lever against a stop 387 projecting from the arm 381. When the timing disk is operated to control the extract of coffee from the last percolator in the machine, the arm 360 will be returned to the latching position shown in Fig. 20 by the pin 145' tripping the escapement arm 374'. This brings the outer end of the arm 385 into position to be engaged by the pin 142' and the contact lever will thereby be operated to bridge the contact terminals 384, thus closing a circuit to a signal lamp 389 (see Fig. 27).

Thermal control of timing disk clutch

Another latch arm 390 (Fig. 5) is pivoted on the shaft 325 and engages the bar 172, being urged into engagement therewith by a spring 391. This latch is controlled by a thermostat in the hot water supply system. The thermostat is indicated diagrammatically in Fig. 27 at 392 and it controls both the heater 55 and a solenoid 393 whereby the latter is energized when the water in the tank 54 has reached the requisite temperature. A plunger 394 is connected by a rod 395 to the arm 390 so that when the solenoid is energized, the arm 390 will be withdrawn from latching position and at the same time, the heater will be turned down to prevent overheating of the water.

Means for resetting the trigger lever

When setting the machine for the beginning of a run, or whenever due to tardiness in replacing the exhausted percolators, the surplus of coffee has run low, it will be necessary to reset the trigger lever 320 so that by the time half of the supply from the first of the fresh lot of percolators has been dispensed or at least ordered, the second percolator will be automatically started.

Resetting of the trigger lever 320 is effected by mechanism shown in Figs. 23, 24, and 25. Mounted to turn freely on the stud 300 and also having a limited vertical sliding motion thereon, is a shrouded pinion 400. The latter is engaged by a toothed segment 401 whose hub 402 is mounted to turn and slide vertically on a stud 403. A spring 404 on the stud 403 normally presses the hub 402 down against a plate 405. The latter is formed with a hub 406 which is journaled on the stud 403. A handle 407 fixed to the plate extends through an aperture in the rear wall of the machine casing. A tension spring 408 attached at one end to a rearward extension 409 of the segment 401, is anchored at its other end to a pin 410 fixed in the base plate 38. This spring holds the segment normally against a stop pin 411 also fixed to the plate 38. Another tension spring 412 is anchored at one end to the pin 410 and at the other to a pin 413 on the plate 405. At each side of the hub 406, there is a roller 414. These rollers turn on alined horizontal shafts 415 journaled in the base plate 38 and they project above the path of the plate 405 so that when the latter is turned by swinging the handle 407 to the position shown in broken lines in Fig. 23, the plate will mount the rollers, sliding upon the stud 403 and raising with it the segment 401. Lifting of the segment also lifts the pinion 400, because of the shrouding of the latter. After the segment and pinion have been thus raised, the pin 413 strikes the extension 409 and turns the segment on its axis, causing a complete rotation of the pinion 400. On the latter is an arm 416 which is adapted to engage an ear 417 on the trigger lever 320 and hence, when the pinion 400 is rotated, the arm 416 strikes the ear 417, no matter what position the trigger 320 and locking lever 337 may occupy. In other words, no matter where these two members may happen to be in their orbit about the shaft 300, when the arm 416 strikes the ear 417, it turns the trigger lever on its axis sufficiently to restore the parts to their initial position with the latching lever 321 holding the trigger lever in operative position as shown in Fig. 16. Thereafter, when the solenoid 317 is again energized, the trigger lever will again strike the lever 333 (Figs. 18 and 19) and throw the latch 326 out of the path of the bar 172, thus allowing the timing disk 81 to turn as previously described, provided, of course, that none of the other latches are in engagement with the bar 172.

The movement of the segment 401 by the handle 407 is limited by its rearward extension 409 striking the pin 411. When in its extreme position, an edge 420 of the segment strikes a pin 421 mounted on a two-armed lever 422 pivoted on a stud 423 fixed in the base 38 (see Fig. 23). The second arm 424 of the lever 422 engages with two pins 425 and 426 depending respectively from extensions of pallets 427 and 428 forming the escapement 329. A spring 429 holds the pallets in the relative position shown in Fig. 23 and a spring 430 (see also Figs. 15 and 18) urges the pallet 427 into engagement with the teeth 327 of the arm 326. As before stated, the segment 401 is actuated to reset the machine for the beginning of a run and at such time it is possible that the latch 326 may be clear of the bar 172 as shown in Fig. 19. To restore the mechanism to its initial position as previously described, the latch 326 must be in engagement with the bar 172. Thus, when the segment 401 is swung to reset the trigger lever 320, it also strikes the pin 421 which movement causes the arm 424 to coact with the pins 425 and 426 and throw the pallets 427 and 428 clear of the teeth 327 of the latch 326. The latter thus freed from the restraining action of the pallet 427 and urged by the spring 330 will be brought into engagement with the bar 172 as desired.

*Electric circuits*

The electric circuits used in the machine are shown in Fig. 27. The motor 66 is connected to a suitable source of electrical energy by a pair of power lines 500 and 501. The thermostat 392 is connected across lines 500 and 501 and controls the heater 55 and the solenoid 393 as explained above. Also connected across the power lines is a shunt line 502 carrying the signal lamp 389 and the normally open switch terminals 384. Another shunt line 503 includes the solenoid 317 for actuating the ratchet wheels 301 and 302. Current to the solenoid 317 is controlled by a switch 504 in the shunt line. This switch is adapted to be operated by a cashier or other authorized person, to register each sale of coffee in the machine and also to insure an adequate supply of coffee in the machine as will be explained hereinafter. The switch may be of any type, but preferably is a key associated with a token delivery device, such as shown in my co-pending application Serial No. 191,805, filed May 16, 1927, in which a token is uttered simultaneously with the operation of the switch so that as a customer pays for a cup of coffee, a token will be automatically furnished to him with which he can obtain the coffee from the machine.

*Operation of the machine*

To prepare the machine for a run, the spider or percolator magazine at the top of the machine is filled with percolators, each charged with a prescribed amount of ground coffee. At the same time the operator depresses the button 371 once for each percolator placed in the magazine, thereby withdrawing the latch arm 360 from the latch bar 172 and moving it away therefrom through an angle determined by the number of percolators in the magazine. The handle 407 is operated to set the trigger lever 416. The tank 54 is filled with water and the timing disk is in its normal position, as shown in Fig. 5, with all the valves except valve 61 closed. Lines 500 and 501 are connected to power by means of a suitable switch, not shown, and the heater 55 is energized to heat water in the tank 54. The latch bar 172 of the timing disk clutch is now held by two latch arms, namely arm 326 (Fig. 18) and arm 39 (Fig. 5).

To start the preparation of a batch of coffee, a cashier or other authorized agent presses the switch key 504, uttering a token and at the same time energizing solenoid 317 to advance the ratchet wheels 301 and 302. The trigger lever 320 operates to move arm 326 out of engagement with latch bar 172 (see Figs. 18 and 19), but the latch bar will continue to be held by the arm 390 until the water in the tank 54 is heated to a predetermined temperature, when the thermostat 392 will turn off the heater 55 and, by energizing solenoid 393, withdraw the latch arm 390. This will result in freeing the clutch lever 171 and connecting the timing disk 81 to power.

The timing disk turns clockwise, as viewed in Fig. 15, and its first act upon being set in motion, is to open valves 63 and 64 by engagement of finger 141 with bellcrank 136 and the consequent operation of clutch 113. This results in forcing the hot water out of the tank 54 and into the percolator 44 which at the time is positioned under the goose neck 58. A moment later the bellcrank 136 is again actuated, this time by finger 142, with the result that valves 63 and 64 are closed. The timing disk continues to turn slowly while the water is percolating through the ground coffee in the percolator and the coffee extract is accumulating in the mixing tank 50. Eventually, the finger 143 will trip the bellcrank lever 133, causing valve 61 to close and valve 60 to open so that the contents of the mixing tank will empty into the storage tank 52, and a moment later, finger 144, by tripping lever 133 will cause valve 60 to close and valve 61 to open, permitting the dispensing reservoir to fill. The machine will then be ready to dispense coffee. In the meantime the pin 145' on finger 145 will strike the arm 374' of the escapement 374 (see also Fig. 20), permitting the latch arm 360 to move back through one tooth spacing and the indicator 375 to indicate that there are only three unused percolators in the machine. When the finger 145 reaches the valve tripping position, it operates bellcrank 135 to cause the opening of valve 62. A moment later finger 146 will trip bellcrank 134 throwing the clutch 80 and thereby indexing the percolator magazine to bring a fresh percolator into operative position. Finally, finger 147 will trip lever 135, causing valve 62 to close and the timing disk will come to rest having completed one full turn.

The token uttered at the initial pressing of the key 504 may be held and charged against starting the machine or it may be given out to the first customer buying a cup of coffee. As each order for coffee is given to the cashier, the key 504 is depressed to utter a token and register a sale in the machine. The ratchet wheel 301 is thus advanced a step at each actuation of solenoid 317, until it has turned through an angle of 180 degrees. The parts are so positioned that when the ratchet wheel reaches this position, half of the batch of coffee prepared will have been sold. At the next step of the ratchet wheel, the finger 340 will trip the latch arm 326 and release the timing wheel clutch again, thereby initiating the preparation of another batch of coffee.

In drawing from the machine the coffee he has paid for, the customer takes a cup from the shelf 35 and places it on the shelf 34 under the spout 37. Then he inserts in the slot 216 the token given him by the cashier. This results in throwing the clutch 196 to connect the dispensing valve to power, and the dispensing valve 65 is opened during a measured time interval. The ratchet wheel 302 which is advanced a step for each sales registration by the cashier is set back a step at each withdrawal of a cup of coffee by the customer and where the sales exceed the withdrawals by such a number that there is danger of flooding the machine by preparing a new batch of coffee before there is room for it, the cam lever 342 coacting with cam 303 will move the arm 390 into latching engagement with the latching bar 172. As coffee is being extracted from the last of the percolators in the magazine, the arm 360 will be moved into latching engagement with latch bar 172 and the arm 385 will be moved into position to be tripped by the pin 142' on finger 142, thereby energizing the signal 389 to notify an attendant that it is time to replenish the magazine.

*Auxiliary control of the dispensing mechanism*

In addition to the token control, auxiliary control means are provided for dispensing coffee and controlling the operation of the machine. As shown in Figs. 28 and 29, a plunger 425 projects from the front casing 31 of the machine adjacent to the token slot 216 and is mounted to slide in a guide 426 fixed to the bracket 214. The rearward end of the plunger 425 engages with an arm 427 which is pivoted on a stud 428 fixed on the bracket 214. The arm 427 and the plunger 425 are held in engagement in the position shown by a spring 429, one end of which is mounted on the guide 426 and the other on the arm 427. An extension 430 is a part of the arm 427 and has pivoted thereon a toe 431 secured by a stud 432. An arm 433 of the toe 431 is held against a stop pin 434 by a spring 435 which connects the arm 433 and the extension 430. A lever 436 is rotatably mounted on a stud 437 fixed in the bracket 214 and has fastened thereto and insulated therefrom a contact blade 438 which is adapted to engage with a pair of contact terminals 439 in circuit with the solenoid 317 and shunting the switch key 504, as shown in Fig. 27. Extending downwardly from the lever 436 is a pin 440 in the path of the toe 431, and an arm 441 of the lever 436 through a spring 442 fixed thereto and by engagement with a stop pin 443 holds the lever in the position shown.

As seen particularly in Fig. 29, the lever 436 also engages with one end of an arm 444 which is fixed to a shaft 445 journaled in the bracket 214. The other end of the shaft 445 has fixed thereto a lever 446 the outer end of which carries a pin 447 engaging with an extension 448 of the lever 235.

The operation of the mechanism just described is as follows. When the operator depresses the plunger 425, the arm 427 is swung outwardly and the extension 430 carries the toe 431 into engagement with the pin 440 which forces the lever 436 toward the contact terminals 439. As may be seen in Fig. 28, the paths of the toe 431 and the pin 440 form intersecting arcs so that a full depression of the plunger 425 will cause the toe 431 to slip by the pin 440. In this manner the contact blade 438 will make only a momentary contact with the terminals 439 for as soon as the toe slips by the pin, the lever 436 will be retracted to its normal position by the spring 442. When the plunger is released, the arm 427 will return to its initial position and toe 431 being again in the path of the pin 440, will yield sufficiently to pass by the pin and, due to the action of the spring 435, will be restored to the position shown. When the lever 436 is actuated, it also strikes the arm 444, hence forcing the pin into contact with extension 448 and thus, as above described, allows the valve 65 to dispense a cup of coffee. The momentary contact of the terminals 439 and the release of the clutch 196 through the coaction of the toe 431 and the pin 440 is provided so that in case the operator should intentionally or inadvertently continue to keep the plunger 425 in its depressed position, the clutch will not continue to revolve and dispense more than one cup of coffee and also the solenoid 317 will not continue to remain energized and keep the pawl 308 (see Fig. 18) in engagement with the ratchet wheel 302, thus preventing the escapement of the wheel by the actuation of the dogs 319 and 354 during the dispensing of the cup of coffee.

Means are provided for locking the plunger 425 so that its depression will be permitted only at such times as it is unlocked by a properly authorized official. In Fig. 28, is shown mounted on the front casing 31 a cylindrical lock 449 carrying at its inner end a lug 450 which, in its illustrated position, is in engagement with a slot 451 in the plunger 425. It is obvious that the turning of the key will swing the lug 450 out of the slot 451 and thus, when it is so desired, the plunger can be conveniently conditioned for depression.

While I have described a preferred embodiment of my invention, I wish it to be understood that my invention is not limited to the specific construction or arrangement of parts illustrated or described, but I reserve the right to make such changes, alterations and modifications as may be desired without departing from the spirit and scope of the invention as defined in the appended claims.

1. A beverage preparing and dispensing machine including mechanism for receiving a beverage-ordering impulse, elements called into action by operation of said mechanism for preparing a beverage, a dispensing device associated with said machine operable to dispense therefrom a measured quantity of beverage, and control mechanism insuring the dispensing only of beverage completely prepared in a predetermined manner.

2. A beverage preparing and dispensing machine including mechanism for receiving a beverage-ordering impulse, elements called into action by operation of said mechanism for preparing a beverage, a token-controlled device for dispensing from said machine a measured quantity of the beverage so prepared, and means cooperating with said impulse receiving mechanism and with said token-controlled device for insuring complete preparation of said beverage before it is dispensed.

3. A beverage preparing and dispensing machine including mechanism for receiving a beverage-ordering impulse, a device for accumulating within the machine orders for said beverage, means for subtracting therefrom the number of measured quantities of beverage dispensed by said machine, elements called into action by operation of said mechanism for preparing a beverage for dispensing, and a member for dispensing from said machine measured quantities of the beverage so prepared.

4. A beverage preparing and dispensing machine including mechanism for receiving a beverage-ordering impulse, elements called into action by said mechanism for preparing a predetermined supply of beverage for dispensing, a member for dispensing from said supply measured quantities of said beverage, a device associated with said impulse receiving mechanism for accumulating within the machine orders for said beverage, means for subtracting therefrom the number of measured quantities of beverage dispensed by said machine, and apparatus calling into action said beverage preparing elements to prepare another predetermined supply of said beverage when a predetermined number of orders for said beverage have been accumulated in said machine.

5. A beverage preparing and dispensing machine including mechanism for receiving a beverage-ordering impulse, elements called into action by said mechanism for preparing a predetermined supply of beverage for dispensing, a member for dispensing from said supply measured quantities of said beverage, a device associated with said impulse receiving mechanism for accumulating within the machine orders for said beverage, means for subtracting therefrom the number of measured quantities of beverage dispensed by said machine, apparatus calling into action said beverage preparing elements to prepare another predetermined supply of said beverage when a predetermined number of orders for said beverage have been accumulated in said machine, and means preventing operation of said apparatus until a predetermined number of measured quantities of said beverage have been dispensed from said machine.

6. A beverage preparing and dispensing machine including mechanism for receiving a beverage-ordering impulse, elements called into action by said mechanism for preparing a predetermined supply of beverage for dispensing, a member for dispensing from said supply measured quantities of said beverage, a device associated with said impulse receiving mechanism for accumulating within the machine orders for said beverage, means for subtracting therefrom the number of measured quantities of beverage dispensed by said machine, apparatus calling into action said beverage preparing elements to prepare another predetermined supply of said beverage when a predetermined number of orders for said beverage have been accumulated in said machine, and means preventing operation of said apparatus so long as the orders accumulated within the machine exceed the measured quantities dispensed by a predetermined number.

7. A coffee preparing and dispensing machine including mechanism for receiving a coffee-ordering impulse, a percolator, means for heating a predetermined supply of water, elements called into action by said impulse receiving mechanism for delivering the supply of water to said percolator, and a device preventing delivery of said supply of water to said percolator until said water has been heated to a predetermined temperature.

8. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn brought into operative position, and devices preventing further delivery of hot water after all of said percolators have individually received one supply thereof.

9. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn brought into operative position, devices preventing further delivery of hot water after all of said percolators have individually received one supply thereof, and elements releasing said devices and permitting delivery of a supply of hot water again to each of said percolators.

10. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn brought into operative position, and a signalling member operable after each percolator in turn has received one supply of hot water.

11. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn brought into operative position, a signalling member operable after each percolator in turn has received one supply of hot water, and devices preventing further delivery of hot water when all of said percolators have individually received one supply of hot water.

12. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn brought into operative position, a signalling member operable after each percolator in turn has received one supply of hot water, devices preventing further delivery of hot water when each of said percolators has received one supply of hot water, and elements releasing said devices and permitting delivery of a supply of hot water again to each of said percolators.

13. A coffee preparing and dispensing machine including mechanism for receiving a coffee-ordering impulse, a plurality of percolators each adapted to contain a charge of ground coffee means for bringing said percolators successively into operative position and apparatus for delivering a supply of hot water to each of said percolators in turn.

14. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn, and a device indicating at all times the number of percolators that have received a supply of hot water.

15. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn, a device indicating at all times the number of percolators that have received a supply of hot water, and a signal operable when the last of said percolators has received its supply of hot water.

16. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn, a device indicating at all times the number of percolators that have received a supply of hot water, and means preventing further delivery of hot water after all of said percolators have received one supply thereof.

17. A coffee preparing and dispensing machine including mechanism for receiving a coffee-ordering impulse, a plurality of percolators each adapted to contain a charge of ground coffee, means for bringing said percolators successively into operative position, apparatus for delivering a supply of hot water to each of said percolators in turn, a device indicating at all times the number of percolators that have received a supply of hot water, a signal operable when the last of said percolators has received its supply of hot water, devices preventing further delivery of hot water after all of said percolators have individually received one supply thereof, and elements releasing said devices and permitting delivery of a supply of hot water again to each of said percolators in turn.

18. A coffee preparing and dispensing machine including a plurality of percolators each adapted to contain a charge of ground coffee, apparatus for delivering a predetermined quantity of hot water at predetermined temperature to each of said percolators in turn, a dispensing reservoir receiving prepared coffee from said percolators, and a token-controlled dispensing valve associated with said reservoir for dispensing measured quantities of coffee therefrom.

19. A coffee preparing and dispensing machine including a plurality of percolators each adapted to contain a charge of ground coffee, apparatus for delivering a predetermined quantity of hot water at predetermined temperature to each of said percolators in turn, a mixing tank receiving coffee prepared in said percolators, a dispensing reservoir receiving coffee from said mixing tank, and a token-controlled dispensing valve associated with said reservoir for dispensing measured quantities of coffee therefrom.

20. A coffee preparing and dispensing machine including a plurality of percolators each adapted to contain a charge of ground coffee, apparatus for delivering a predetermined quantity of hot water at predetermined temperature to each of said percolators in turn, a mixing tank receiving coffee prepared in said percolators, a storage tank receiving coffee from said mixing tank, a dispensing reservoir receiving coffee from said storage tank, means for maintaining a constant level of coffee in said dispensing reservoir, and a token-controlled dispensing valve associated with said reservoir for dispensing measured quantities of coffee therefrom.

21. A coffee preparing and dispensing machine including a plurality of percolators each adapted to contain a charge of ground coffee, apparatus for delivering a predetermined quantity of hot water at predetermined temperature to each of said percolators in turn, a mixing tank receiving prepared coffee from said percolators, a mixing tank delivery valve, a storage tank receiving coffee from said mixing tank through said mixing tank valve, a storage tank delivery valve, a dispensing reservoir receiving coffee from said storage tank through said storage tank valve, timing mechanism for operating said valves in predetermined timed relation, and a token-controlled dispensing valve associated with said reservoir for dispensing measured quantities of coffee therefrom.

22. A coffee preparing and dispensing machine including a plurality of percolators each adapted to contain a charge of ground coffee, a heating tank, a water delivery line leading thereto, a hot water delivery line leading therefrom to deliver hot water to said percolators, a pressure line associated with said tank, mechanism operable only after water in said heating tank reaches a predetermined temperature to release pressure in said pressure line and deliver the heated water to one of said percolators, a dispensing reservoir receiving prepared coffee from said percolators, and a token-controlled dispensing valve associated with said reservoir for dispensing measured quantities of coffee therefrom.

23. A coffee preparing and dispensing machine including a percolator adapted to contain a charge of ground coffee, a heating tank, a water delivery line leading thereto, a valve controlling said water delivery line, a hot water delivery line leading from said heating tank to deliver hot water to said percolator, a valve controlling said hot water delivery line, a pressure line associated with said heating tank, a valve controlling said pressure line, a mixing tank for receiving prepared coffee from said percolators, a mixing tank delivery valve, a storage tank for receiving coffee from said mixing tank through said mixing tank valve, a storage tank delivery valve, a dispensing reservoir for receiving coffee from said storage tank through said storage tank valve, timing mechanism for operating said valves in predetermined timed relation first to deliver water to said heating tank, then to deliver by pressure heated water from said heating tank to said percolator only after said water has been heated to a predetermined temperature, then to deliver coffee from the mixing tank to the storage tank and thence to the dispensing reservoir, and a dispensing valve associated with said reservoir for dispensing measured quantities of coffee therefrom.

In testimony whereof, I have signed this specification.

HARRY RUSSELL BRAND.